United States Patent
Takasaka

(10) Patent No.: US 8,873,898 B2
(45) Date of Patent: Oct. 28, 2014

(54) POLARIZATION INDEPENDENT WAVELENGTH CONVERTER AND POLARIZATION INDEPENDENT WAVELENGTH CONVERSION METHOD

(75) Inventor: Shigehiro Takasaka, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 222 days.

(21) Appl. No.: 13/619,024

(22) Filed: Sep. 14, 2012

(65) Prior Publication Data

US 2013/0101248 A1 Apr. 25, 2013

Related U.S. Application Data

(63) Continuation of application No. PCT/JP2011/056839, filed on Mar. 22, 2011.

(60) Provisional application No. 61/315,755, filed on Mar. 19, 2010, provisional application No. 61/382,638, filed on Sep. 14, 2010.

(51) Int. Cl.
| | | |
|---|---|---|
| *G02B 6/00* | (2006.01) | |
| *G02F 1/365* | (2006.01) | |
| *G02F 1/35* | (2006.01) | |
| *G02B 6/26* | (2006.01) | |
| *G02F 2/00* | (2006.01) | |

(52) U.S. Cl.
CPC .............. *G02B 6/26* (2013.01); *G02F 2203/06* (2013.01); *G02F 2002/006* (2013.01); *G02F 2/004* (2013.01); *G02F 1/365* (2013.01); *G02F 1/353* (2013.01)
USPC .......................................................... 385/11

(58) Field of Classification Search
None
See application file for complete search history.

(56) References Cited

U.S. PATENT DOCUMENTS

| 2004/0246568 A1* | 12/2004 | Onaka et al. .................. 359/337 |
| 2005/0157991 A1 | 7/2005 | Terahara et al. |
| 2007/0230882 A1* | 10/2007 | Hainberger .................. 385/122 |

FOREIGN PATENT DOCUMENTS

| JP | 07-043764 | 2/1995 |
| JP | 2002-131791 | 5/2002 |

(Continued)

OTHER PUBLICATIONS

International Search Report dated Apr. 19, 2011 issued for International Application No. PCT/JP2011-056839, filed Mar. 22, 2011w/ English Translation).

(Continued)

*Primary Examiner* — Sung Pak
(74) *Attorney, Agent, or Firm* — Oblon, Spivak, McClelland, Maier & Neustadt, L.L.P.

(57) ABSTRACT

A polarization independent wavelength converter includes a polarization maintaining optical fiber which includes a first and a second ends and has a first polarization axis and a second polarization axis, the first and the second polarization axes being orthogonal to each other and propagating light at different velocities, and a group velocity difference cancellation unit that receives a signal light having a certain polarization state and a pump light including a polarization component parallel to the first polarization axis and a polarization component parallel to the second polarization axis and that causes the signal light and a wavelength-converted light generated in the polarization maintaining optical fiber by the signal and the pump lights to pass through the polarization maintaining optical fiber in a manner not to be influenced by a group velocity difference of each of the signal and the wavelength-converted lights between the first and the second polarization axes.

19 Claims, 17 Drawing Sheets

(56) References Cited

FOREIGN PATENT DOCUMENTS

| JP | 3476806 | 9/2003 |
| JP | 2004-117065 | 4/2004 |
| JP | 2009-264826 | 11/2009 |

OTHER PUBLICATIONS

International Written Opinion issued Apr. 19, 2011 for PCT/JP2011-0569839.

T. Morioka et al., "Polarisation-independent 100 Gbit/s all-optical demultiplexer using four-wave mixing in a polarization-maintaining fibre loop", Electronics Letters (1994), vol. 30, No. 7, pp. 591-592.

R. Calvani et al., "Polarisation independent all-optical demultiplexing using four wave mixing in dispersion shifted fibre", Electronics Letters (1999), vol. 35, No. 1, pp. 72-73.

M. Takahashi et al., "Full C-L Band Tunable Wavelength Conversion by Zero Dispersion and Zero Dispersion Slope HNLF," ECOC 2009, Sep. 20-24, 2009, p. P1.08.

* cited by examiner

POLARIZATION INDEPENDENT WAVELENGTH CONVERTER AND POLARIZATION INDEPENDENT WAVELENGTH CONVERSION METHOD

CROSS-REFERENCE TO RELATED APPLICATIONS

This application is a continuation of PCT International Application No. PCT/JP2011/056839 filed on Mar. 22, 2011 which claims the benefit of priority from U.S. Patent Applications No. 61/315,755 filed on Mar. 19, 2010 and No. 61/382,638 filed on Sep. 14, 2010, the entire contents of which are incorporated herein by reference.

BACKGROUND OF THE INVENTION

1. Field of the Invention

The present invention relates to a polarization independent wavelength converter and a polarization independent wavelength conversion method.

2. Description of the Related Art

In optical transmission, the transmission capacity increases at a rate of 1.4 times/year, and it has reached over 100 Gbits/s at some nodes. With the increase in the transmission capacity, power consumption due to the optical transmission increases, so that reduction in the power consumption is becoming a problem to be solved. There is a known technology to deal with an optical signal without converting it to an electrical signal as a method of reducing power consumption. This technology splits or combines signal lights of different wavelengths in a Wavelength Division Multiplexing (WDM) signal light launched into a certain node with a wavelength selection switch and transmits the split or combined signal lights to different nodes. When the wavelengths of a plurality of signal lights transmitted to the different nodes are equal, it is necessary to convert the plurality of signal lights into different wavelengths to combine the plurality of signal lights.

As a method of optically converting a certain wavelength of a signal light into a different wavelength of a signal light, there is a method of using optical non-linearity of an optical fiber. In order to perform the wavelength conversion by Four Wave Mixing (FWM) which is one of the non-linear optical effects, an input signal light as a subject of the wavelength conversion, and a pump light having a wavelength different from that of the input signal light are input to the same optical fiber. Then, a signal light having a wavelength which is converted (hereinafter, referred to as a wavelength-converted light) is generated in the optical fiber, so that the wavelength-converted signal light as well as the input signal light and the pump light are output from the optical fiber.

In FWM, when the optical frequency of the input signal light is assumed to be vs [Hz], the optical frequency of the pump light is assumed to be vp [Hz], and the optical frequency of the wavelength-converted light is assumed to be vc [Hz], the relation "vp=(vs+vc)/2" is established. When the speed of light is assumed to be C [nm/s], the relation "$\lambda=C/v$" is established between the optical frequency v [Hz(=1/s)] and the wavelength $\lambda$ [nm]. Therefore, when the wavelength of the input signal light is assumed to be $\lambda s$ [nm], the wavelength of the pump light is assumed to be $\lambda p$ [nm], and the wavelength of the wavelength-converted light is assumed to be $\lambda c$ [nm], the relation "$(1/\lambda p)=[(1/\lambda s)+(1/\lambda c)]/2$" is established. Therefore, when the wavelength of the input signal light and the desired wavelength of the wavelength-converted light are given, the wavelength of the pump light is determined. In the following document, a signal light is successfully converted into an arbitrary wavelength in the wavelength range of from 1530 nm to 1610 nm by FWM in a High Non-Linear Fiber (HNLF) (M. Takahashi et al., "Full C-L Band Tunable Wavelength Conversion by Zero Dispersion and Zero Dispersion Slope HNLF," ECOC2009, P1.08, 2009. hereinafter to be referred to as Nonpatent Reference 1).

In order to improve the efficiency of generation of the wavelength-converted light by FWM (or wavelength-conversion efficiency), a polarization of the input signal light and a polarization of the pump light are preferably adjusted to match each other. In Nonpatent Reference 1, the polarization of each signal light is adjusted by a polarization controller so that the polarizations of two signal lights may match each other.

However, it is preferable that the wavelength conversion is performed without using the polarization controller to use the wavelength converter in an optical communication system. It is because the polarization of the input signal light may have various polarization states. Adding an automatic polarization regulator that regulates the polarization controller in accordance with the polarization state of the input signal light to the wavelength converter is considered to be practically disadvantageous from the viewpoint of manufacturing cost and packaging area or volume. Moreover, the reliability of operation improves by reducing the number of devices which have to be controlled during the operation of the wavelength converter.

Japanese Patent No. 3476806 (hereinafter to be referred to as Patent Reference 1) discloses a method in which a polarization maintaining optical fiber is used as an optical fiber to generate FMW, as a method of exhibiting a constant wavelength-conversion efficiency regardless of the polarization state of the input signal light even without using the polarization controller.

SUMMARY OF THE INVENTION

It is an object of the present invention to at least partially solve the problems in the conventional technology.

According to an aspect of the present invention, there is provided a polarization independent wavelength converter which includes a polarization maintaining optical fiber which includes a first end and a second end and has a first polarization axis and a second polarization axis. The first polarization axis and the second polarization axis are orthogonal to each other and propagate light at different velocities. The polarization independent wavelength converter further includes a group velocity difference cancellation unit that receives a signal light having a certain polarization state and a pump light including a polarization component parallel to the first polarization axis and a polarization component parallel to the second polarization axis and that causes the signal light and a wavelength-converted light to pass through the polarization maintaining optical fiber in a manner not to be influenced by a group velocity difference of each of the signal light and the wavelength-converted light between the first polarization axis and the second polarization axis. The wavelength converted light is light generated in the polarization maintaining optical fiber by propagation of the signal light and the pump light through the polarization maintaining optical fiber.

According to an another aspect of the present invention, there is provided a polarization independent wavelength conversion method which includes receiving a signal light and a pump light, the signal light and the pump light being lights to be input to a polarization maintaining optical fiber including a first end and a second end and having a first polarization axis and a second polarization axis. The first polarization axis and the second polarization axis are orthogonal to each other and propagating light at different velocities. The signal light has a certain polarization state. The pump light includes a polarization component parallel to the first polarization axis and a polarization component parallel to the second polarization axis The polarization independent wavelength conversion method further includes causing the signal light and a wavelength-converted light to pass through the polarization maintaining optical fiber in a manner not to be influenced by a group velocity difference of each of the signal light and the wavelength-converted light between the first polarization axis and the second polarization axis. The wavelength-converted light is light generated in the polarization maintaining optical fiber by propagation of the signal light and the pump light through the polarization maintaining optical fiber.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The polarization independent wavelength converter as disclosed in Patent Reference 1 has a problem that the wavelength-converted light which is output is not likely to have information that is included in the input signal light sufficiently.

Figure 28:
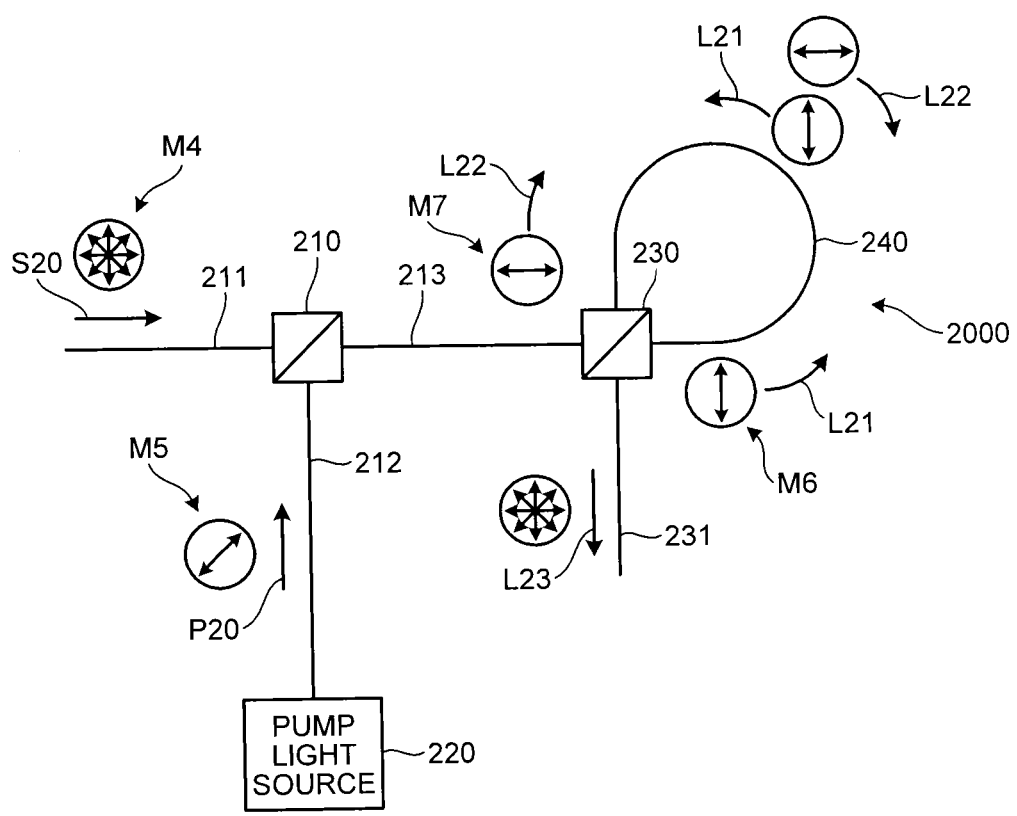
FIG. 28 is a schematic diagram that illustrates a configuration of a conventional polarization independent wavelength converter that uses a polarization maintaining optical fiber.

FIG. 28 is a schematic diagram that illustrates a configuration of a conventional polarization independent wavelength converter that uses a polarization maintaining optical fiber disclosed in Patent Reference 1. A polarization independent wavelength converter 2000 illustrated in FIG. 28 includes an optical coupler 210, a pump light source 220, a polarization splitter 230, a polarization maintaining optical fiber 240, and an output optical fiber 231.

The optical coupler 210 includes two input optical fibers 211 and 212 and one output optical fiber 213. The pump light source 220 is connected to the input optical fiber 212. The polarization splitter 230 is connected to the output optical fiber 213, the polarization maintaining optical fiber 240, and the output optical fiber 231. The polarization maintaining optical fiber 240 is connected to the polarization splitter 230 in a loop shape.

The principle of the operation of the polarization independent wavelength converter 2000 is as follows. In the optical coupler 210, an input signal light S20 of a random polarization, which is input from the input optical fiber 211, and a pump light P20 of a slant polarization at 45 degrees from the polarization axis of the polarization splitter 230 at a next stage are combines. A sign M4 indicates that the polarization of the input signal light S20 is the random polarization. A sign M5 indicates that the polarization of the pump light P20 is the slant polarization at 45 degrees. The combined light propagates along the output optical fiber 213 and enters the polarization splitter 230, thereby splitting into a light L21 having a polarization parallel to the polarization axis of the polarization splitter 230, and a light L22 having a polarization perpendicular to the polarization axis of the polarization splitter 230. Signs M6 and M7 indicate that the polarizations of the light L21 and the light L22 are respectively parallel or perpendicular to the polarization axis of the polarization splitter 230. When the light L21 of the parallel polarization passes through the polarization splitter 230, the light L22 of the perpendicular polarization reflects in the polarization splitter 230 so that the optical path of the light L22 is bent by 90 degrees. Since the polarization of the pump light P20 is slant at 45 degrees from the polarization axis of the polarization splitter 230, the pump light P20 is divided into a vertical polarization component and a horizontal polarization component in a ratio of 1:1 by the polarization splitter 230. On the other hand, since the polarization of the input signal light S20 is random, the input signal light S20 is divided into a vertical polarization component and a horizontal polarization component in an arbitrary ratio by the polarization splitter 230.

Two polarization axes of the polarization maintaining optical fiber 240 connected to the polarization splitter 230 are respectively parallel to and perpendicular to the polarization axis of the polarization splitter 230. Therefore, the light L21 and the light L22, each having been divided into respective polarizations by the polarization splitter 230, are combined with mutually different polarization axes of the polarization maintaining optical fiber 240, and then propagate in opposite directions to each other while maintaining the polarizations which are the same as those of the combined polarization axes. Next, the light L21 and the light L22 that have propagated through the polarization maintaining optical fiber 240 arrive again at the polarization splitter 230. In the polarization splitter 230, the light L21 of the polarization which has passed through the polarization splitter 230 passes through again the polarization splitter 230. On the other hand, the optical path of the light L22 of the polarization, the optical path of which is reflected by 90 degrees in the polarization splitter 230, is reflected again by 90 degrees in the polarization splitter 230. After that, the two lights L21 and L22 with the polarizations orthogonal to each other are combined while being output from the polarization splitter 230, and propagate again along the output optical fiber 231 as a light L23 of random polarization.

The wavelength conversion efficiency in a optical fiber is proportional to $(Pp)^2 \times Ps$ based on the principle of the FWM when the power of the pump light is assumed to be Pp and the power of the input signal light is assumed to be Ps. That is, when the power of the pump light is a constant value, the wavelength conversion efficiency is proportional to the power of the input signal light.

In the polarization independent wavelength converter 2000, the power of the pump light P20 contained in each of the lights L21 and L22 of two polarizations, which have been obtained by the splitting by the polarization splitter 230 and propagate through the polarization maintaining optical fiber 240 in the opposite directions to each other, is equal. Therefore, the power of the wavelength-converted light generated on each of the two polarizations is proportional to the power in each polarization of the input signal light S20 divided by the polarization splitter 230. As a result, it is considered that the wavelength-converted light, which is output from the polarization splitter 230 and is then combined, is generated with constant wavelength conversion efficiency regardless of the variation in the polarization state of the input signal light S20. That is, the polarization independent wavelength converter 2000 can generate the wavelength-converted light with the constant wavelength conversion efficiency all the time independent of the polarization state of the input signal light S20.

However, the polarization independent wavelength converter 2000 does not consider a difference in group velocity of the light between the slow axis and the fast axis that are orthogonal polarization axes of the polarization maintaining optical fiber 240. Therefore, the lights of the two polarization components orthogonal to each other which are obtained by dividing the input signal light S20 with the polarization splitter 230 may propagate along the respective polarization axes of the polarization maintaining optical fiber 240 at different propagation velocities while generating the wavelength-converted lights, so that timings at which the wavelength-converted lights of the generated two orthogonal polarization components arrive at the polarization splitter 230 are not coincident with each other. Therefore, the wavelength-converted lights of the two orthogonal polarization components may be output from the polarization splitter 230 at different timings each other, and then be combined.

When a polarization maintaining HNLF with a nonlinear coefficient of 10 [1/W/km] or more is used as an optical fiber that generates FWM, the length of the fiber is generally set to about 100 m. Here, the beat length, which is a length causing the phase of the light propagating along the slow axis and the phase of the light propagating the fast axis to be shifted by $2\pi$, is considered. When the beat length of the polarization maintaining HNLF is 5 mm which is equal to the beat length of a general polarization maintaining optical fiber and when the wavelength of the light propagating through the polarization maintaining HNLF is 1.55 µm (the optical frequency is about 193 THz), the time deviation between the light propagating along the slow axis and the light propagating along the fast axis is 103.6 ps when they have propagated through the polarization maintaining HNLF of 100 m. When considering that the time slot of a signal having a symbol rate of 10 Gbit/s is about 100 ps, the time deviation between the light which has propagated along the fast axis and the light which has propagated along the slow axis cannot be neglected because the time deviation is about a time corresponding to one time slot. When the symbol rate is further increased, the time deviation may correspond to a plurality of time slots. Even when the polarizations of the wavelength-converted lights of two orthogonal polarization components having such a time deviation are combined, the combined wavelength-converted light cannot correctly maintain the information included in the input signal light. Therefore, it is not suitable to use the conventional polarization independent wavelength converter in optical communication systems.

Furthermore, the following method cannot be used as a method of compensating for the difference in the group velocity between the two polarization axes: in the method, two polarization maintaining optical fibers which are perfectly identical in length are prepared. Then, a signal light, which has propagated along a slow axis of a first polarization maintaining optical fiber, is made propagate along a fast axis of a second polarization maintaining optical fiber, while a signal light, which has propagated along the fast axis of the first polarization maintaining optical fiber, is made propagate along the slow axis of the second polarization maintaining optical fiber.

Though this method seems to function correctly, this method cannot be used as a method of compensating for the difference in the group velocity for the following reasons (1) and (2): (1) when preparing two polarization maintaining optical fibers of about 100 m which is considered a necessary length to obtain wavelength-converted lights sufficiently, it is technically difficult to cut the two polarization maintaining optical fibers so as to have the substantially same length with an error margin smaller than a wavelength of light; and (2) even if the two polarization maintaining optical fibers having the same length with an error margin smaller than a wavelength of light can be cut, the length of the polarization maintaining optical fibers may be decreased or increased by an amount larger than the wavelength of light due to the tension generated when the polarization maintaining optical fibers are wound around a bobbin or in the shape of a coil, the stacked arrangement of the wound polarization maintaining optical fibers, or a physical environment such as temperature and wind. Therefore, the difference in length more than a wavelength of light may be easily generated in the two polarization maintaining optical fibers.

Preferable requirement of the wavelength converter that can be used in optical communication systems are as follows: (1) it has to generate a wavelength-converted light in a certain constant efficiency without being influenced by the polarization state of an input signal light; and (2) information included in the wavelength-converted light is the same as information which is superimposed to the input signal light by intensity modulation, phase modulation, or a combination of those modulations.

According to a polarization independent wavelength converter and a polarization independent wavelength conversion method according to embodiments of the present invention, a different in group velocity between a light which propagates along a slow axis of a polarization maintaining optical fiber, which is a nonlinear medium to generate a wavelength-converted light, and a light which propagates along a fast axis is compensated for, so that wavelength conversion that does not depend on the polarization of an input signal light can be achieved without being influenced by the difference in group velocity, and information loss due to the wavelength conversion can be removed. The compensation for the difference in group velocity between two axes can be achieved, for example, by a configuration in which a signal light, which has propagated along a slow axis of a certain polarization maintaining optical fiber, is made propagate along a fast axis of the polarization maintaining optical fiber, while a signal light, which has propagated along the fast axis of the polarization maintaining optical fiber, is made propagate along the slow axis of the polarization maintaining optical fiber.

The method of compensating for the difference in group velocity by making the signal lights propagate along both the slow axis and the fast axis of the same polarization maintaining optical fiber functions correctly even when the fiber length of the polarization maintaining optical fiber expands or contracts by the change in a physical environment. The reason is that, since the time taken for the light to propagate through the optical fiber of about 100 m is microseconds order while the expansion and contraction of the fiber length due to the change in a physical environment is an extremely slow change of second order, the expansion or contraction of the fiber length more than the wavelength of the light does not occur while propagating of the light through the optical fiber. Moreover, unlike when two polarization maintaining optical fibers are used, such an event that the length of one polarization maintaining optical fiber expands and the length of the other polarization maintaining optical fiber contracts does not occur.

The influence of the group velocity difference also can be canceled by a method of dividing a signal light into two polarization components orthogonal to each other, applying one of polarization components and the remaining polarization component respectively to both opposite ends of a single polarization maintaining optical fiber so that polarization directions of both the polarization components meet at one polarization axis of the polarization maintaining optical fiber, and combining the respective polarization components, which have propagated through the polarization maintaining optical fiber and then are output from the mutually different ends of the polarization maintaining optical fiber.

Hereinbelow, exemplary embodiments of a polarization independent wavelength converter and a polarization independent wavelength conversion method according to the present invention will be described below in greater detail with reference to the accompanying drawings. Like components are denoted by like reference numerals throughout the drawings. The present invention is not limited to the embodiments, and various modifications may be made within the spirit and scope of the present invention.

Figure 1:
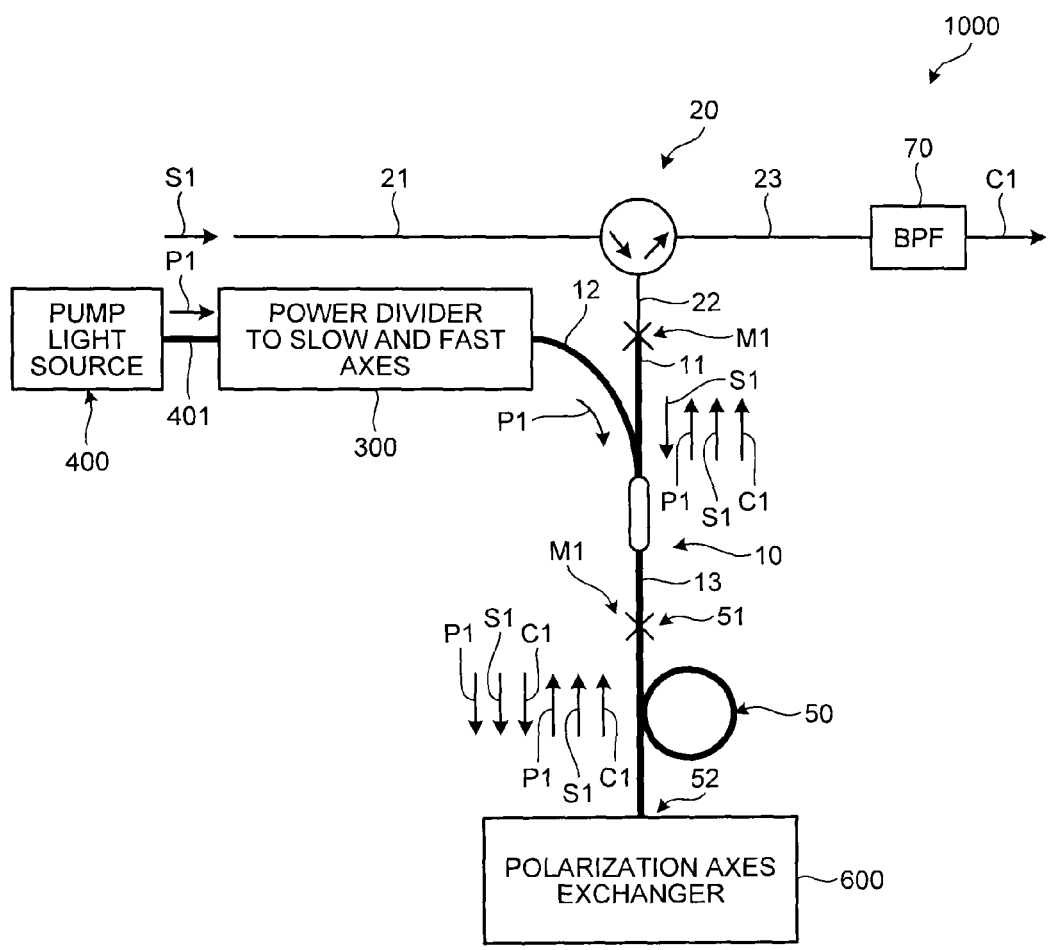
FIG. 1 is a schematic diagram that illustrates a basic configuration of a polarization independent wavelength converter according to a first embodiment of the present invention.

FIG. 1 is a schematic diagram that illustrates a basic configuration of a polarization independent wavelength converter according to a first embodiment of the present invention. As illustrated in FIG. 1, a polarization independent wavelength converter 1000 includes an optical splitter/combiner 10, an optical circulator 20, a two-axis optical power divider 300, a pump light source 400, a polarization maintaining optical fiber 50, a polarization axes exchanger 600, and an optical band pass filter (BPS) 70.

The optical splitter/combiner 10 includes input/output optical fibers 11, 12, and 13. The input/output optical fibers 11, 12, and 13 are a polarization maintaining type. Each of the input/output optical fibers 11, 12, and 13 includes a slow axis and a fast axis as polarization axes orthogonal to each other. The Input/output optical fiber 11 may not be the polarization maintaining type. The optical splitter/combiner 10 combines lights which are respectively input from the input/output optical fibers 11 and 12 and outputs the multiplexed light to the input/output optical fiber 13. Moreover, the optical splitter/combiner 10 splits the light input from the input/output optical fiber 13 into two lights at a predetermined splitting ratio so as to be respectively output to the input/output optical fibers 11 and 12. The optical splitter/combiner 10 may be a 3 dB coupler.

The optical circulator 20 includes an input optical fiber 21, an input/output optical fiber 22, and an output optical fiber 23. The optical circulator 20 outputs the light, which has been input from the input optical fiber 21, to the input/output optical fiber 22, and outputs the light, which has been input from the input/output optical fiber 22, to the output optical fiber 23. The input/output optical fiber 22 is connected to the input/output optical fiber 11 of the optical splitter/combiner 10. A sign M1 denotes a connecting point of the optical fibers. The optical circulator 20 may be a polarization independent type.

The two-axis optical power divider 300 is connected to the input/output optical fiber 12 of the optical splitter/combiner 10. The pump light source 400 is connected to the two-axis optical power divider 300 via a connection optical fiber 401 of a polarization maintaining type.

The polarization maintaining optical fiber 50 as a nonlinear optical medium, in which the FWM is generated, includes a first end 51 and a second end 52 and has a fast axis and a slow axis that are mutually orthogonal polarization axes. The first end 51 is connected to the input/output optical fiber 13 of the optical splitter/combiner 10 such that their polarization axes are aligned with each other. The second end 52 is connected to the polarization axes exchanger 600. The optical band pass filter 70 is connected to the output optical fiber 23 of the optical circulator 20.

Next, the operation of the polarization independent wavelength converter 1000 is described. The optical circulator 20 outputs a signal light S1 in an arbitrary polarization state, which is input from the input optical fiber 21, to the input/output optical fiber 22. The signal light S1 is input to the input/output optical fiber 11 of the optical splitter/combiner 10. In the input/output optical fiber 11, the signal light S1 propagates such that the power of the light is distributed in a ratio according to the polarization state in a polarization direction parallel to the fast axis and in a polarization direction parallel to the slow axis.

The pump light source 400 outputs a pump light P1 having a wavelength different from that of the signal light S1 to the two-axis optical power divider 300 via the connection optical fiber 401. The two-axis optical power divider 300 divides the power of the input pump light P1 and outputs the divided power in the polarization direction parallel to the slow axis and the polarization direction parallel to the fast axis of the input/output optical fiber 12 of the optical splitter/combiner 10. The power division ratio may be preferably adjusted such that the dependence of the wavelength conversion efficiency on the polarization state of the signal light S1 in the polarization independent wavelength converter 1000 described later is minimized, and the power division ratio is preferably fixed after the adjustment.

Next, the optical splitter/combiner 10 combines the signal light S1, the power of which is divided to be distributed in the polarization directions parallel to the polarization axes, and the pump light P1. The combined light of the signal light S1 and the pump light P1 is output from the input/output optical fiber 13 while maintaining the polarization state, and is then input to the first end 51 of the polarization maintaining optical fiber 50.

Next, the polarization maintaining optical fiber 50 generates a wavelength-converted light C1 by FWM while allowing the combined light of the signal light S1 and the pump light P1 to propagate along itself. The combined light of the signal light S1 and the pump light P1, and the wavelength-converted light C1 propagate along the polarization maintaining optical fiber 50 while maintaining the polarization states thereof. After that, the signal light S1, the pump light P1, and the wavelength-converted light C1 that have arrived at the second end 52 of the polarization maintaining optical fiber 50 are output from the second end 52, and then input to the polarization axes exchanger 600.

The polarization axes exchanger 600 exchanges the polarization axes, along which the lights of respective polarization directions, that is, the signal light S1, the pump light P1, and the wavelength-converted light C1, have propagated, and the polarization axes along which the lights of the respective polarization directions are to propagate with each other, and then outputs the respective lights to the second end 52 of the polarization maintaining optical fiber 50.

The polarization maintaining optical fiber 50 allows the signal light S1, the pump light P1, and the wavelength-converted light C1, which are input, to propagate along itself, and outputs the lights from the first end 51 to the optical splitter/combiner 10. The optical splitter/combiner 10 outputs the signal light S1, the pump light P1, and the wavelength-converted light C1 from the input/output optical fiber 11 to the optical circulator 20. The optical circulator 20 outputs the signal light S1, the pump light P1, and the wavelength-converted light C1, which are input, from the output optical fiber 23 to the optical band pass filter 70.

The optical band pass filter 70 has the transmittance wavelength characteristic to transmit the wavelength-converted light C1 but not to transmit the signal light S1 and the pump light P1. As a result, the optical band pass filter 70 outputs only the wavelength-converted light C1.

Figure 2:
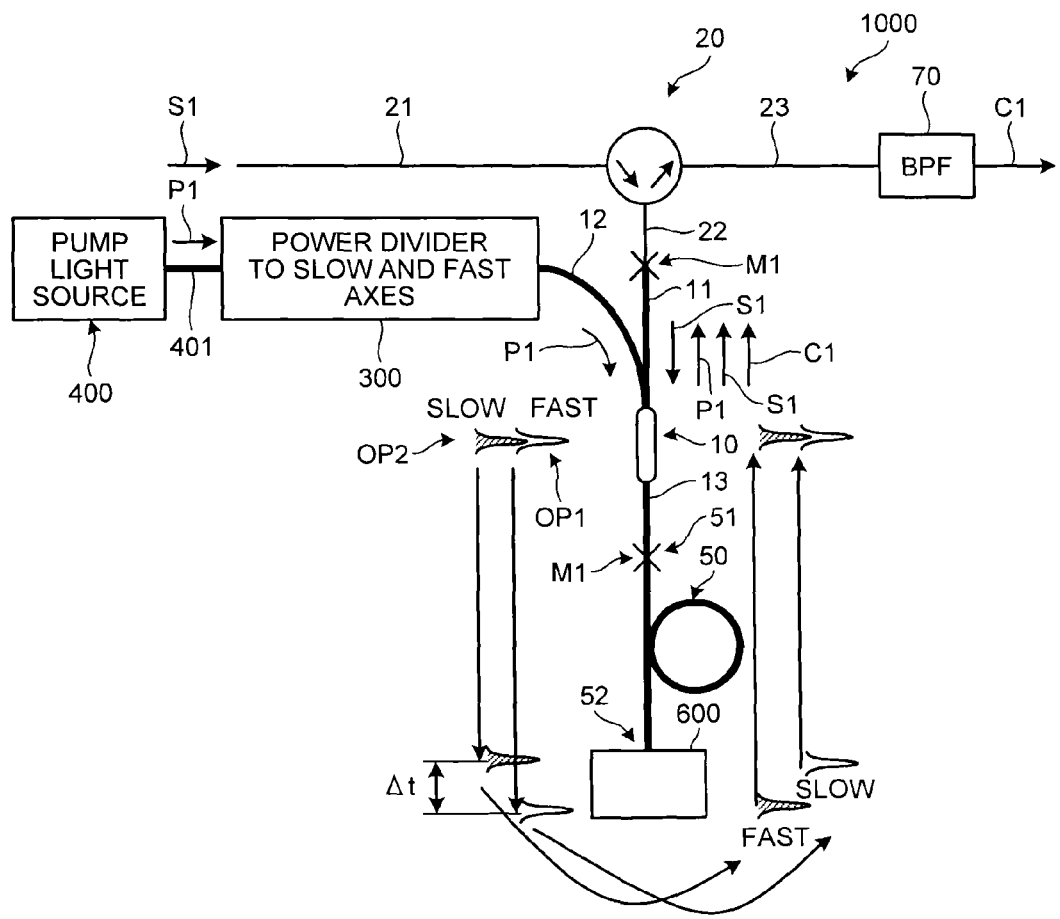
FIG. 2 is a diagram to describe, in detail, the operation of the polarization independent wavelength converter according to the first embodiment.

FIG. 2 is a diagram that describes the operation of the polarization independent wavelength converter 1000 according to the first embodiment in detail. As illustrated in FIG. 2, the signal light S1 in an arbitrary polarization state is input to the optical splitter/combiner 10 along with the pump light P1 via the optical circulator 20, and then is input to the polarization maintaining optical fiber 50. The signal light S1 is assumed to be a light pulse. The signal light S1 propagates such that the power of the light is divided into a light pulse OP1 having a polarization direction parallel to the fast axis and a light pulse OP2 having a polarization direction parallel to the slow axis in a ratio according to the polarization state. The light pulse OP1, which has propagated along the fast axis, arrives at the second end 52 of the polarization maintaining optical fiber 50 and then outputs to be input to the polarization axes exchanger 600 earlier than the light pulse OP2 does, which has propagated along the slow axis, by a time difference Δt.

The polarization axes exchanger 600 changes the polarization directions of the light pulses OP1 and OP2 such that the light pulse OP1, which has propagated along the fast axis, then propagates along the slow axis and the light pulse OP2, which has propagated along the slow axis, then propagates along the fast axis, so that the polarization axes, along which the light pulses OP1 and OP2 are respectively scheduled to propagate, are exchanged with each other. Then the polarization axes exchanger 600 inputs the light pulses OP1 and OP2 to the second end 52 of the polarization maintaining optical fiber 50.

After that, when the light pulses OP1 and OP2 arrive at the first end 51 after propagating in the opposite directions, an arrival time deviation Δt which is generated at the second end 52 is compensated for. As a result, the light pulses OP1 and OP2 simultaneously arrive at the optical splitter/combiner 10.

The effect that the arrival time deviation Δt is compensated for is exhibited for the wavelength-converted light C1. That is, there is an arrival time deviation Δt between a wavelength-converted light (a first wavelength-converted light) generated by the light pulse OP1 of the signal light S1 which has propagated along the fast axis and a wavelength-converted light (a second wavelength-converted light) generated by the light pulse OP2 of the signal light S1 which has propagated along the slow axis when the first and second wavelength-converted lights have arrived at the second end 52. However, since the polarization axes exchanger 600 exchanges the polarization axes, along which to propagate the light pulses, by changing the propagation directions of the first and second wavelength-converted lights so that the first wavelength-converted light, which has propagated along the fast axis, propagates along the slow axis and the second wavelength-converted light, which has propagated along the slow axis, propagates along the fast axis, the arrival time deviation Δt is compensated for. As a result, the information loss due to the wavelength conversion can be eliminated.

Next, the configuration of the polarization independent wavelength converter 1000 is described more specifically.

First, a polarization maintaining optical amplifier to amplify the pump light P1 may be inserted in any path in a preceding stage of the optical splitter/combiner 10. Moreover, a polarizer to improve an extinction ratio of the pump light P1 may be inserted in any path in a preceding stage of the two-axis optical power divider 300. Moreover, a polarization maintaining opto-isolator to prevent the pump light P1 from returning toward the pump light source 400 may be inserted in any path in a preceding stage of the optical splitter/combiner 10.

Figure 3:
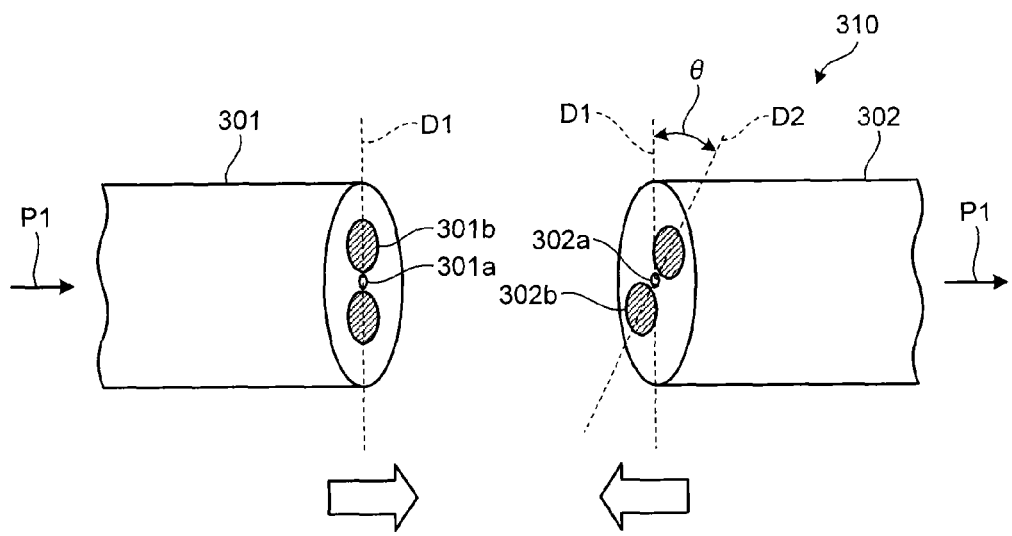
FIG. 3 is a schematic diagram that illustrates one example of a specific configuration of a two-axis optical power divider.

Next, the specific configuration of the two-axis optical power divider 300 is described. FIG. 3 is a schematic diagram that illustrates an example of the specific configuration of the two-axis optical power divider. A two-axis optical power divider 310 is configured such that an end surface of an input-side polarization maintaining optical fiber 301 which includes a core 301a and a stress applying member 301b and which is connected to the pump light source 400 side, and an end surface of an output-side polarization maintaining optical fiber 302 which includes a core 302a and a stress applying member 302b and which is connected to the optical splitter/combiner 10 side are in fused connection or physical contact with each other. In this connection or contact, a slow axis D1 of the input-side polarization maintaining optical fiber 301 and a slow axis D2 of the output-side polarization maintaining optical fiber 302 have an angle θ therebetween.

When the pump light P1 having a polarization which is parallel to the slow axis D1 of the input-side polarization maintaining optical fiber 301 or parallel to the fast axis orthogonal to the slow axis D1 is input, the two-axis optical power divider 310 divides the power of the pump light P1 to be output to the polarization direction parallel to the slow axis D2 and the polarization direction parallel to the fast axis of the output-side polarization maintaining optical fiber 302 in accordance with the angle θ. The angle θ is preferably adjustable and is preferably fixed after the adjustment.

The θ is preferably adjusted such that the dependence of the wavelength conversion efficiency of the wavelength-converted light C1 on the polarization state of the signal light S1 in the polarization independent wavelength converter 1000 is minimized. The angle θ is, for example, 45 degrees±5 degrees. When the angle θ is 45 degrees±5 degrees, the pump light P1 which propagates through the output-side polarization maintaining optical fiber 302 becomes a substantially linearly polarized state. Moreover, in order to make the angle θ more correctly adjustable by rotating the input-side polarization maintaining optical fiber 301 or the output-side polarization maintaining optical fiber 302 around the central axis of the longitudinal direction, it is desirable that the end surface of the input-side polarization maintaining optical fiber 301 and the end surface of the output-side polarization maintaining optical fiber 302 which are to be brought into contact with each other are perpendicular to the central axis and are flat. It is preferable that the two-axis optical power divider 310 is used when an extinction ratio of the pump light P1 output from the input-side polarization maintaining optical fiber 301 is high at, for example, 20 dB or more.

Figure 4:
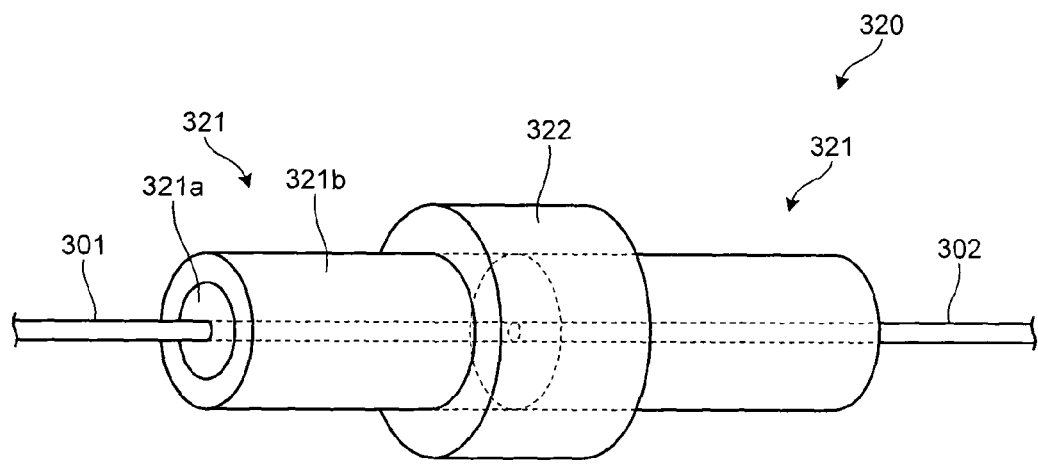
FIG. 4 is a schematic diagram that illustrates another example of the specific configuration of the two-axis optical power divider.

FIG. 4 is a schematic diagram that illustrates another example of the specific configuration of the two-axis optical power divider. A two-axis optical power divider 320 includes the input-side polarization maintaining optical fiber 301, the output-side polarization maintaining optical fiber 302, ferrules 321 formed at an end of the input-side polarization maintaining optical fiber 301 and an end of the output-side polarization maintaining optical fiber 302, and a sleeve 322 to hold the ferrules 321. Each of the ferrules 321 includes an internal portion 321a made of, for example, zirconia, and a coating 321b formed on the outer circumference of the internal portion 321a and made of, for example, metal. The sleeve 322 is desirably metallic.

In the two-axis optical power divider 320, the physical contact between the input-side polarization maintaining optical fiber 301 and the output-side polarization maintaining optical fiber 302 may be made by inserting the two ferrules 321 in the sleeve 322 to contact each other. In addition, an angle between the polarization axes of the input-side polarization maintaining optical fiber 301 and the output-side polarization maintaining optical fiber 302 can be adjusted by rotating the input-side or output-side polarization maintaining optical fiber 301 or 302 around the central axis. Moreover, the angle between the polarization axes may be fixed by welding, laser-welding, or soldering the sleeve 322 and the ferrules 321 after the adjustment of the angle. In order to more correctly adjust the angle between the polarization axes, it is desirable that end surfaces of the input-side polarization maintaining optical fiber 301 and the output-side polarization maintaining optical fiber 302 are perpendicular to the central axis and are flat.

Figure 5:
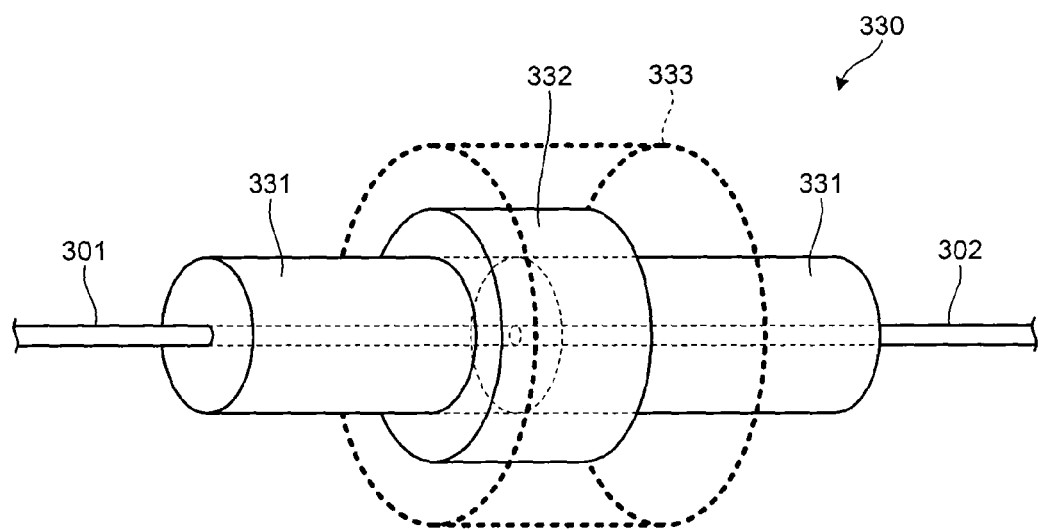
FIG. 5 is a schematic diagram that illustrates a further example of the specific configuration of the two-axis optical power divider.

FIG. 5 is a schematic diagram that illustrates another example of the specific configuration of the two-axis optical power divider. A two-axis optical power divider 330 includes the input-side polarization maintaining optical fiber 301, the output-side polarization maintaining optical fiber 302, ferrules 331 formed at an end of the input-side polarization maintaining optical fiber 301 and an end of the output-side polarization maintaining optical fiber 302, and a sleeve 332 to hold the ferrules 331. The ferrules 331 are preferably made of zirconium for example.

In the two-axis optical power divider 330, the physical contact between the input-side polarization maintaining optical fiber 301 and the output-side polarization maintaining optical fiber 302 may be made by inserting the two ferrules 331 in the sleeve 332 to contact each other. In addition, an angle between the polarization axes of the input-side polarization maintaining optical fiber 301 and the output-side polarization maintaining optical fiber 302 can be adjusted by rotating the input-side or output-side polarization maintaining optical fiber 301 or 302 around the central axis. Moreover, the angle between the polarization axes can be fixed by connecting the sleeve 332 and the ferrules 331 with an adhesive after the adjustment. A region to apply the adhesive for the connection is, for instance, a region 333. In order to more correctly adjust the angle between the polarization axes, it is desirable that end surfaces of the input-side polarization maintaining optical fiber 301 and the output-side polarization maintaining optical fiber 302 are perpendicular to the medial axis and are flat.

Figure 6:
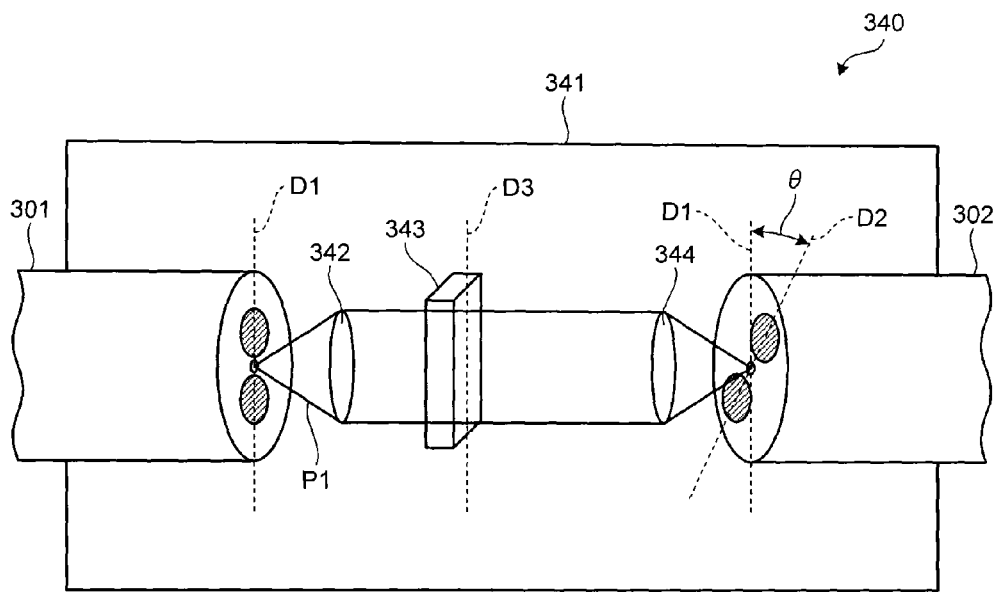
FIG. 6 is a schematic diagram that illustrates a still further example of the specific configuration of the two-axis optical power divider.

FIG. 6 is a schematic diagram that illustrates another example of the specific configuration of the two-axis optical power divider. A two-axis optical power divider 340 includes the input-side polarization maintaining optical fiber 301, the output-side polarization maintaining optical fiber 302, a casing 341, a collimator lens 342, a polarizer 343, and a condenser lens 344, and these components are packed as a module. The input-side polarization maintaining optical fiber 301 and the output-side polarization maintaining optical fiber 302 may be inserted in and fixed to the ferrules, respectively.

The input-side polarization maintaining optical fiber 301 and the output-side polarization maintaining optical fiber 302 are inserted in the casing 341 and are disposed such that the end surfaces thereof face each other. The slow axis D1 of the input-side polarization maintaining optical fiber 301 and the slow axis D2 of the output-side polarization maintaining optical fiber 302 have the angle θ therebetween. The θ may be adjusted such that the dependence of the wavelength conversion efficiency of the wavelength-converted light C1 on the polarization state of the signal light S1 in the polarization independent wavelength converter 1000 is minimized.

The collimator lens 342, the polarizer 343, and the condenser lens 344 are accommodated in the casing 341 and are arranged in this order from the end surface of the input-side polarization maintaining optical fiber 301 toward the end surface of the output-side polarization maintaining optical fiber 302. When the pump light P1 having a polarization parallel to the slow axis D1 of the input-side polarization maintaining optical fiber 301 is input, the polarizer 343 is disposed such that a polarization axis D3 is substantially parallel to the slow axis D1 in order to increase an extinction ratio of the pump light P1.

In the two-axis optical power divider 340, the collimator lens 342 makes the pump light P1 output from the input-side polarization maintaining optical fiber 301a parallel light. The polarizer 343 increases the extinction ratio of the pump light P1 which has become the parallel light. The condenser lens 344 couples the pump light P1, the extinction ratio of which has been increased to the output-side polarization maintaining optical fiber 302. That is, in the two-axis optical power divider 340, the input-side polarization maintaining optical fiber 301 and the output-side polarization maintaining optical fiber 302 are spatial-optically coupled.

In the two-axis optical power divider 340, after the adjustment of the angle θ, the input-side polarization maintaining optical fiber 301, the output-side polarization maintaining optical fiber 302, the collimator lens 342, the polarizer 343, and the condenser lens 344 are fixed to the casing 341 by using fixing means such as adhesive, welding, laser-welding, or soldering. The input-side polarization maintaining optical fiber 301 and the output-side polarization maintaining optical fiber 302 may be fixed to the casing 341 via ferrules which the input-side polarization maintaining optical fiber 301 and the output-side polarization maintaining optical fiber 302 are inserted in and fixed to.

The polarizer 343 may not be included when the extinction ratio of the pump light P1 output from the input-side polarization maintaining optical fiber 301 is high at, for example, 20 dB or more.

Figure 7:
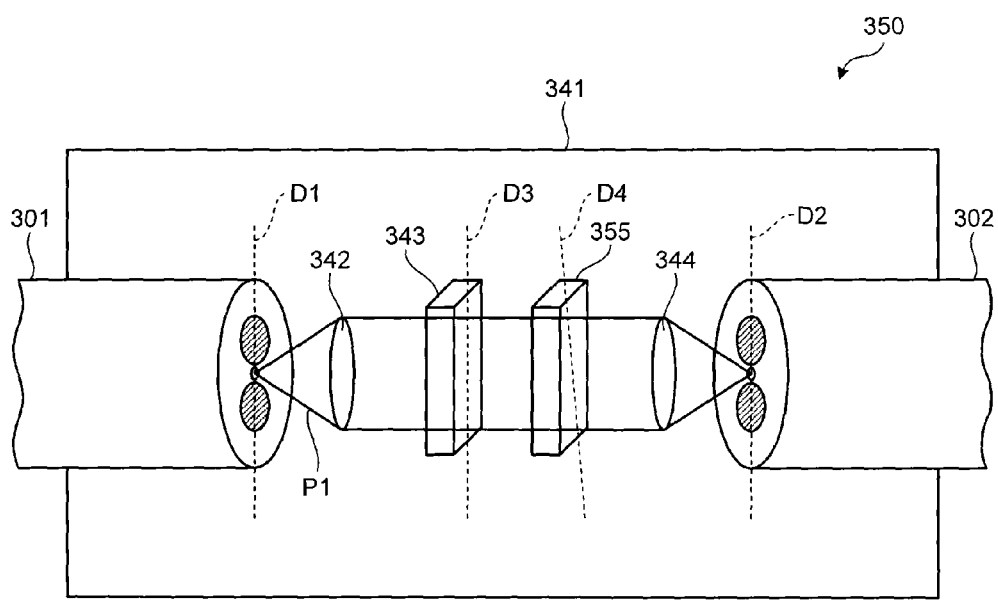
FIG. 7 is a schematic diagram that illustrates a yet further example of the specific configuration of the two-axis optical power divider.

FIG. 7 is a schematic diagram that illustrates another example of the specific configuration of the two-axis optical power divider. A two-axis optical power divider 350 includes the input-side polarization maintaining optical fiber 301, the output-side polarization maintaining optical fiber 302, the casing 341, the collimator lens 342, the polarizer 343, a λ/4 plate 355, and the condenser lens 344, and these components are packed as a module. The input-side polarization maintaining optical fiber 301 and the output-side polarization maintaining optical fiber 302 are inserted in the casing 341 and are disposed such that the end surfaces thereof face each other.

The collimator lens 342, the polarizer 343, the λ/4 plate 355, and the condenser lens 344 are accommodated in the casing 341 and are arranged in this order from the end surface of the input-side polarization maintaining optical fiber 301 toward the end surface of the output-side polarization maintaining optical fiber 302. When the pump light P1 having a polarization parallel to the slow axis D1 of the input-side polarization maintaining optical fiber 301 is input, the polarizer 343 is disposed such that the polarization axis D3 is substantially parallel to the slow axis D1 in order to increase an extinction ratio of the pump light P1.

In the two-axis optical power divider 350, the collimator lens 342 makes the pump light P1 output from the input-side polarization maintaining optical fiber 301 parallel light. The polarizer 343 increases the extinction ratio of the pump light P1 which has become the parallel light. The λ/4 plate 355 makes the pump light P1, the extinction ratio of which has become increased, a circularly polarized light. The condenser lens 344 couples the pump light P1, which has become the circularly polarized light, to the output-side polarization maintaining optical fiber 302. With this, the power of the pump light P1 is divided to be distributed in a polarization direction parallel to the slow axis D2 of the output-side polarization maintaining optical fiber 302 and a polarization direction parallel to a fast axis of the output-side polarization maintaining optical fiber 302.

In the two-axis optical power divider 350, it may not be necessary that the slow axis D1 of the input-side polarization maintaining optical fiber 301 and the slow axis D2 of the output-side polarization maintaining optical fiber 302 are parallel or orthogonal to each other. As a result, the two-axis optical power divider 350 can be easily manufactured in a module. Moreover, it is desirable to use the λ/4 plate 355 which is most suitable for the central wavelength of the desired wavelength range to be subjected to wavelength conversion. An angle of a polarization axis D4 of the λ/4 plate 355 may be adjusted such that the dependence of the wavelength conversion efficiency of the wavelength-converted light C1 on the polarization state of the signal light S1 in the polarization independent wavelength converter 1000 is minimized.

The two-axis optical power divider 350 is suitably used even when an extinction ratio of the pump light P1 output from the input-side polarization maintaining optical fiber 301 is lower than 20 dB. However, the polarizer 343 may not be included when the extinction ratio of the pump light P1 is 20 dB or more and the angle of the polarization axis D4 of the λ/4 plate 355 can be precisely adjusted.

When finely adjusting the angle of the polarization axis D4 of the λ/4 plate 355 while measuring the polarization state dependence of the wavelength conversion efficiency or the polarization state dependence of a bit error rate (BER), which is a transmission characteristic, the adjustment is preferably performed in a state in which the wavelength of the pump light P1 is set to the central wavelength of the wavelength range to be subjected to the wavelength conversion.

Figure 8:
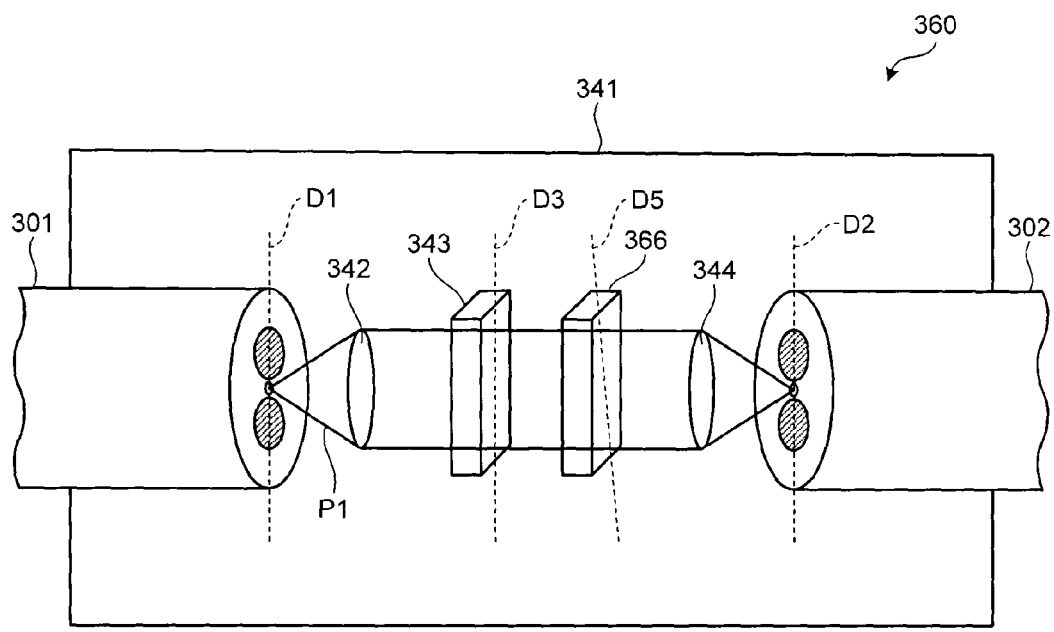
FIG. 8 is a schematic diagram that illustrates a yet further example of the specific configuration of the two-axis optical power divider.

FIG. 8 is a schematic diagram that illustrates another example of the specific configuration of the two-axis optical power divider. A two-axis optical power divider 360 includes the input-side polarization maintaining optical fiber 301, the output-side polarization maintaining optical fiber 302, the casing 341, the collimator lens 342, the polarizer 343, a λ/2 plate 366, and the condenser lens 344 lens, and these components are packed as a module.

The input-side polarization maintaining optical fiber 301 and the output-side polarization maintaining optical fiber 302 are inserted in the casing 341 and are disposed such that the end surfaces thereof face each other. The slow axis D1 of the input-side polarization maintaining optical fiber 301 and the slow axis D2 of the output-side polarization maintaining optical fiber 302 are substantially parallel to each other. The slow axis D1 and the slow axis D2 may be orthogonal to each other.

The collimator lens 342, the polarizer 343, the λ/2 plate 366, the condenser lens 344 are accommodated in the casing 341 and are arranged in this order from the end surface of the input-side polarization maintaining optical fiber 301 toward the end surface of the output-side polarization maintaining optical fiber 302. When the pump light P1 having a polarization parallel to the slow axis D1 of the input-side polarization maintaining optical fiber 301 is input, the polarizer 343 is disposed such that the polarization axis D3 is substantially parallel to the slow axis D1 in order to increase an extinction ratio of the pump light P1. The λ/2 plate 366 is disposed such that a polarization axis D5 is slant at an angle of 22.5 degrees with respect to the polarization axis D3 of the polarizer 343.

In the two-axis optical power divider 360, the collimator lens 342 makes the pump light P1 output from the input-side polarization maintaining optical fiber 301a parallel light. The polarizer 343 increases the extinction ratio of the pump light P1 which has become the parallel light. The λ/2 plate 366 rotates the polarization direction of the pump light P1, the extinction ratio of which has become increased, by 22.5 degrees. As a result, the polarization direction of the pump light P1 becomes slant at an angle of 45 degrees with respect to the slow axis D1 of the input-side polarization maintaining optical fiber 301. The condenser lens 344 couples the pump light P1, the polarization direction of which has been rotated, to the output-side polarization maintaining optical fiber 302. With this, the power of the pump light P1 is divided to be distributed in a polarization direction parallel to the slow axis D2 of the output-side polarization maintaining optical fiber 302 and a polarization direction parallel to a fast axis of the output-side polarization maintaining optical fiber 302.

Moreover, it is desirable to use the λ/2 plate 366 which is most suitable for the central wavelength of the desired wavelength range to be subjected to wavelength conversion. An angle of the polarization axis D5 of the λ/2 plate 366 may be adjusted such that dependence of the wavelength conversion efficiency of the wavelength-converted light C1 on the polarization state of the signal light S1 in the polarization independent wavelength converter 1000 is minimized.

The two-axis optical power divider 360 is suitably used even when an extinction ratio of the pump light P1 output from the input-side polarization maintaining optical fiber 301 is lower than 20 dB. However, the polarizer 343 may not be included when the extinction ratio of the pump light P1 is 20 dB or more and the angle between the polarization axis of the input-side polarization maintaining optical fiber 301 and the polarization axis D5 of the λ/2 plate 366 can be precisely adjusted.

When finely adjusting the angle of the λ/2 plate 366 while measuring the polarization state dependence of the wavelength conversion efficiency or the polarization state dependence of a BER, the adjustment is preferably performed in a state in which the wavelength of the pump light P1 is set to the central wavelength of the wavelength range to be subjected to the wavelength conversion.

Figure 9:
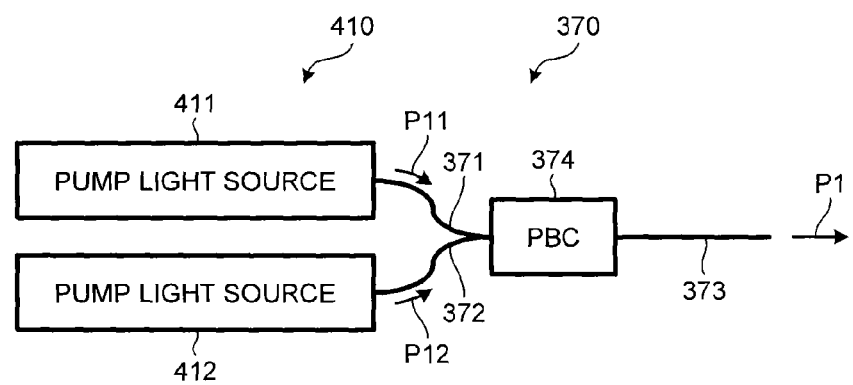
FIG. 9 is a schematic diagram that illustrates a yet further example of the specific configuration of the two-axis optical power divider.

FIG. 9 is a schematic diagram that illustrates a further example of the specific configuration of the two-axis optical power divider. A two-axis optical power divider 370 is configured by using a polarization beam combiner (PBC) 374 which includes input-side polarization maintaining optical fibers 371 and 372 and an output-side polarization maintaining optical fiber 373.

The two-axis optical power divider 370 is used in combination with a pump light source 410 including pump light sources 411 and 412 which output pump lights P11 and P12 which are linearly polarized and have an equal wavelength. The linearly polarized pump lights P11 and P12, which are output from the pump light sources 411 and 412, are input to the two-axis optical power divider 370 through the input-side polarization maintaining optical fibers 371 and 372. The polarization beam combiner 374 combines the pump light P11 and the pump light P12 such that the polarization directions are orthogonal to each other, and outputs the resultant lights from the output-side polarization maintaining optical fiber 373. At this time, the pump light P11 is output to propagate along a slow axis of the output-side polarization maintaining optical fiber 373 and the pump light P12 is output to propagate along a fast axis, for example. As a result, the pump light P1, in which the optical power is divided to be distributed to the slow axis and the fast axis of the output-side polarization maintaining optical fiber 373, is obtained.

The powers of the pump light P11 and the power of the pump light P12 may be adjusted such that dependence of wavelength conversion efficiency of the wavelength-converted light C1 on the polarization state of the signal light S1 in the polarization independent wavelength converter 1000 is minimized. For example, the power of the pump light P11 and the power of the pump light P12 may be adjusted such that the power of light in the slow axis of the output-side polarization maintaining optical fiber 373 is equal to the power of light in the fast axis of the output-side polarization maintaining optical fiber 373.

Next, a specific configuration of the polarization maintaining optical fiber 50 is described. It is desirable that the polarization maintaining optical fiber 50 that is a nonlinear optical medium to generate the wavelength-converted light C1 is a high nonlinear fiber having a nonlinear coefficient γ of 5 [l/W/km] or more. Since the larger the nonlinear coefficient γ is, the shorter the fiber length necessary to obtain the wavelength-converted light C1 having desired power, it becomes easy to miniaturize a module in which the polarization maintaining optical fiber 50 is wound. In addition, since the larger the nonlinear coefficient γ of the polarization maintaining optical fiber 50 is, the smaller the total dispersion quantity of the chromatic dispersion added to the light which propagates along the polarization maintaining optical fiber 50, the wavelength conversion bandwidth of the polarization independent wavelength converter 1000 becomes broader. It is desirable to decrease the chromatic dispersion value of the polarization maintaining optical fiber 50 to as small value as possible because the wavelength conversion bandwidth of the polarization independent wavelength converter 1000 is broader. For example, it is at least desirable that the chromatic dispersion value of the polarization maintaining optical fiber 50 is 1 [ps/nm/km] or less as in terms of an absolute value of the dispersion value. In addition, it is desirable that the polarization maintaining optical fiber 50 has a plurality of zero-dispersion wavelengths within the predetermined wavelength conversion bandwidth when the zero-dispersion wavelength is defined as a wavelength at which the chromatic dispersion value is zero. When there is a plurality of zero-dispersion wavelengths, even if the wavelength of the pump light P1 is set to an arbitrary wavelength within the predetermined wavelength conversion bandwidth, the wavelength conversion efficiency can be maintained within a certain range (for example, within 3 dB from the maximum conversion efficiency). In addition, it is desirable that a dispersion slope of the polarization maintaining optical fiber 50 approximates 0 as closely as possible. When the dispersion slope approximates zero, even if the wavelength of the pump light P1 is set to an arbitrary wavelength within the predetermined wavelength conversion bandwidth, the wavelength conversion efficiency can be maintained within a certain range (for example, within 3 dB from the maximum conversion efficiency). In addition, it is desirable that a difference in the chromatic dispersion value between the slow axis and the fast axis of the polarization maintaining optical fiber 50 is small at, for example, 0.5 [ps/nm/km] or less. When the difference in the chromatic dispersion value is small, the wavelength conversion efficiency and/or the wavelength conversion bandwidth are equal in levels for each polarization axis.

Moreover, it is desirable that the polarization extinction ratios of the polarization maintaining optical fiber 50, other polarization maintaining type optical fibers, and polarization maintaining type devices are 20 dB or more. When the polarization extinction ratios are 20 dB or more, the dependence of the wavelength conversion efficiency of the wavelength-converted light C1 on the polarization state of the signal light S1 decreases.

Figure 10:
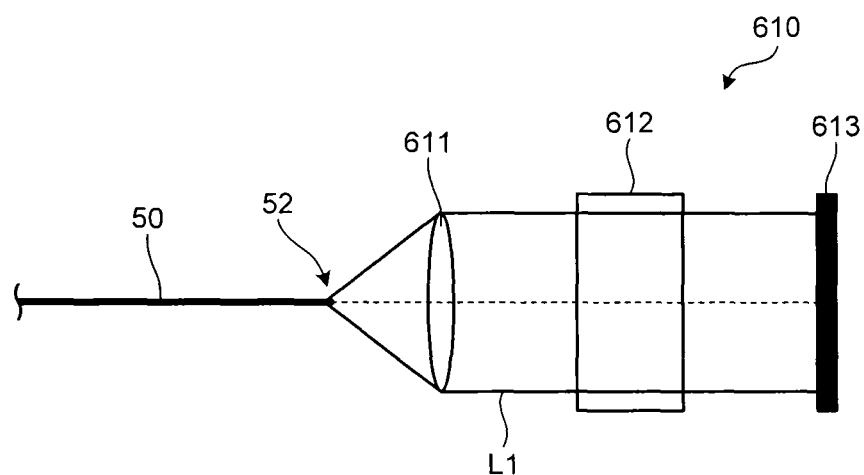
FIG. 10 is a schematic diagram that illustrates an example of a specific configuration of a polarization axes exchanger.

Next, the specific configuration of the polarization axes exchanger 600 is described. FIG. 10 is a schematic diagram that illustrates an example of a specific configuration of a polarization axes exchanger. A polarization axes exchanger 610 includes a collimator lens 611, a Faraday element 612, a mirror 613, and a magnet (not illustrate) which are arranged in this order from the side where the polarization maintaining optical fiber 50 is disposed. The polarization axes exchanger 610 has a configuration of a Faraday rotator mirror (FRM).

In the polarization axes exchanger 610, the collimator lens 611 makes a light L1 output from the second end 52 of the polarization maintaining optical fiber 50 a parallel light. Here, the light L1 includes the pump light P1, the signal light S1, and the wavelength-converted light C1. When the light L1 passes, The Faraday element 612 rotates the plane of the polarization of the light L1 by 45 degrees by the action of the magnet when the light L1 passes therethrough. The mirror 613 reflects the light L1 that passed through the Faraday element 612, causing the reflected light L1 to pass through the Faraday element 612 again. As a result, since the polarization plane of the light L1 rotates by 45 degrees further, the polarization plane rotates by 90 degrees in total. The collimator lens 611 inputs the light L1, the polarization plane of which is rotated by 90 degrees, to the second end 52 of the polarization maintaining optical fiber 50. Since the polarization plane of the light L1 is rotated by 90 degrees, the light which has propagated along the slow axis of the polarization maintaining optical fiber 50 couples with the fast axis, and the light which has propagated along the fast axis couples with the slow axis. As a result, the polarization axes, along which the lights which have propagated along the respective polarization axes of the polarization maintaining optical fiber 50 are scheduled to propagate, are exchanged.

Since the number of optical elements, through which the light L1 needs to pass to exchange the polarization axes, can be suppressed to the minimum in the polarization axes exchanger 610, the occurrence of coupling loss of light or the addition of the chromatic dispersion to the light L1 can be suppressed to the minimum. Further, it is desirable that a rotating angle of the polarization plane is adjusted to 90 degrees for the central wavelength of the wavelength range of the light to be subjected to the wavelength conversion in the Faraday element 612.

Figure 11:
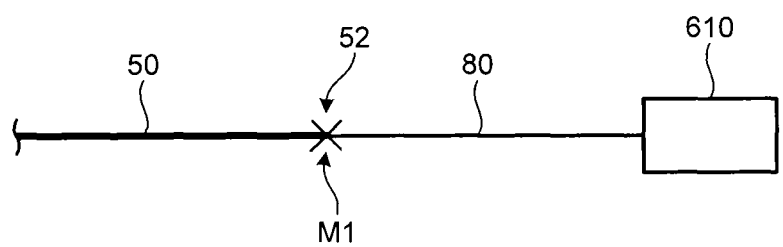
FIG. 11 is a schematic diagram that illustrates a configuration in which a mode field conversion optical fiber is interposed between the polarization axes exchanger of FIG. 10 and a polarization maintaining optical fiber.

FIG. 11 is a schematic diagram that illustrates a configuration in which a mode field conversion optical fiber 80 is interposed between the polarization axes exchanger 610 and the polarization maintaining optical fiber 50. When an optical fiber with a small mode field such as a high nonlinear fiber is used as the polarization maintaining optical fiber 50, it is likely to be difficult to provide a collimator lens because a numerical aperture (NA) of the polarization maintaining optical fiber 50 is large in such a case and an emerging angle of light output from the second end 52 of the polarization maintaining optical fiber 50 is wide for such a reason. In the configuration of FIG. 11, the difficulty may be moderated by interposing the mode field conversion optical fiber 80 for changing (expanding) the mode field.

Here, the mode field conversion optical fiber 80 may be or may not be a polarization maintaining type. In addition, an optical fiber used as the mode field conversion optical fiber 80 preferably has a small chromatic dispersion value and is short in length. When the chromatic dispersion value and the length of the mode field conversion optical fiber 80 are decreased, the chromatic dispersion quantity, which is added to light when the pump light P1 and the signal light S1 reciprocate through the mode field conversion optical fiber 80 and is then input to the polarization maintaining optical fiber 50 again, can be decreased. Accordingly, the decrease in the efficiency of FWM which is attributable to the increase in the chromatic dispersion quantity can be suppressed.

Figure 12:
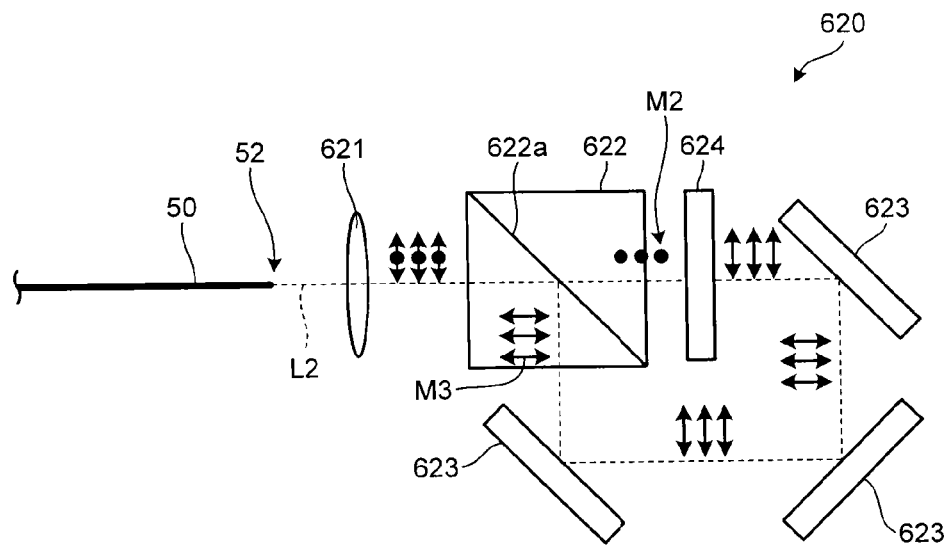
FIG. 12 is a schematic diagram that illustrates another example of the specific configuration of the polarization axes exchanger.

FIG. 12 is a schematic diagram that illustrates an example of a specific configuration of a polarization axes exchanger. A polarization axes exchanger 620 includes a collimator lens 621, a polarization beam splitter 622, three mirrors 623, and a λ/2 plate 624. A sign M2 means that the polarization direction of light is perpendicular to the sheet. A sign M3 means that the polarization direction of light is parallel to the sheet.

In the polarization axes exchanger 620, the collimator lens 621 makes a light L2 output from the second end 52 of the polarization maintaining optical fiber 50 a parallel light. Here, the light L2 includes the pump light P1, the signal light S1, and the wavelength-converted light C1. Moreover, the light L2 contains two polarization components orthogonal to each other. The polarization beam splitter 622 has a polarization axis which is parallel to or perpendicular to the polarization axis of the polarization maintaining optical fiber 50, and separates the light L2 into two lights polarized orthogonally to each other with a separation surface 622a. Each of the two lights separated by the polarization beam splitter 622 is output from an output part of the polarization beam splitter 622 and is then input from the output part, which has output the light of a polarization perpendicular to the polarization thereof, to the polarization splitter 622 by the three mirrors 623 that form a loop path. Here, each of the polarization planes of the two lights rotates by 90 degrees before the lights are input to the respective output parts of the polarization splitter 622 because the λ/2 plate 624 is inserted in the loop path. As a result, the two lights are combined in a state in which the polarization planes thereof are rotated by 90 degrees by the polarization beam splitter 622. As a result, the light which has propagated along the slow axis of the polarization maintaining optical fiber 50 couples with the fast axis, and the light which has propagated along the fast axis couples with the slow axis. Accordingly, the polarization axes, along which the lights which have propagated along the respective polarization axes of the polarization maintaining optical fiber 50 are scheduled to propagate, are exchanged.

Since the number of optical elements, through which the light L2 needs to pass to exchange the polarization axes, can be suppressed to the minimum in the polarization axes exchanger 620, the occurrence of coupling loss of light or the addition of the chromatic dispersion to the pump light P1 or the signal light S1 can be suppressed to the minimum. It is desirable to use the polarization beam splitter 622 and the λ/2 plate 624 which are designed and manufactured such that it has a most suitable characteristic for the central wavelength of the wavelength range of light to be subjected to the wavelength conversion.

Figure 13:
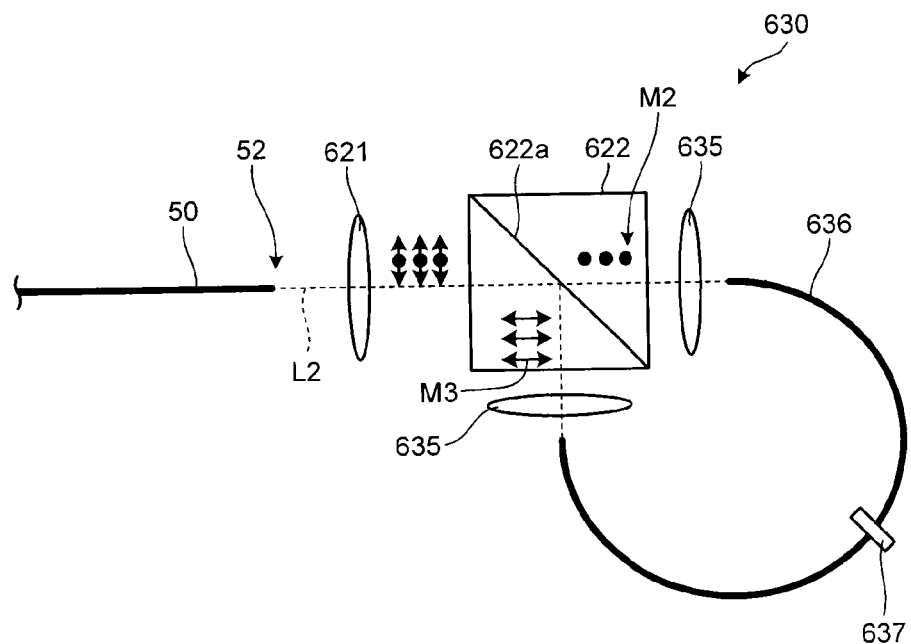
FIG. 13 is a schematic diagram that illustrates a further example of the specific configuration of the polarization axes exchanger.

FIG. 13 is a schematic diagram that illustrates another example of a specific configuration of a polarization axes exchanger. A polarization axes exchanger 630 includes the collimator lens 621, the polarization beam splitter 622, two condenser lenses 635, and a polarization axes exchanging optical fiber 636. The polarization axes exchanging optical fiber 636 has a configuration in which two polarization maintaining optical fibers are connected to each other in a connecting point 637 in a state in which the polarization axes thereof are orthogonal to each other.

In the polarization axes exchanger 630, the collimator lens 621 makes the light L2 output from the second end 52 of the polarization maintaining optical fiber 50 a parallel light. The polarization beams splitter 622 divides the light L2 into two lights having polarizations orthogonal to each other with the separation surface 622a. The two lights separated by the polarization splitter 622 are input to the polarization axes exchanging optical fiber 636 which forms a loop path by the condenser lens 635 after being output from the polarization beams splitter 622. Each of the two lights is input to the polarization beam splitter 622 from the output parts which have output a light of a polarization orthogonal to the polarization thereof by the polarization axes exchanging optical fiber 636. Here, in the polarization axes exchanging optical fiber 636, the polarization planes of the two lights to propagate are rotated by 90 degrees at the connecting point 637. As a result, the two lights are combined in a state in which the polarization planes thereof are rotated by 90 degrees by the polarization beam splitter 622. As a result, the light which has propagated along the slow axis of the polarization maintaining optical fiber 50 couples with the fast axis, and the light which has propagated along the fast axis couples with the slow axis. As a result, the polarization axes, along which the lights which have propagated along the respective polarization axes of the polarization maintaining optical fiber 50 are scheduled to propagate, are exchanged.

The polarization axes exchanging optical fiber 636 preferably has a small chromatic dispersion value and is short in length. When the chromatic dispersion value and the length of the polarization axes exchanging optical fiber 636 are decreased, the chromatic dispersion quantity, which is added to light when the pump light P1 and the signal light S1 propagate through the polarization axes exchanging optical fiber 636 and is then input to the polarization maintaining optical fiber 50 again, can be decreased. Accordingly, the decrease in the efficiency of FWM which is attributable to the increase in the chromatic dispersion quantity can be suppressed.

Figure 14:
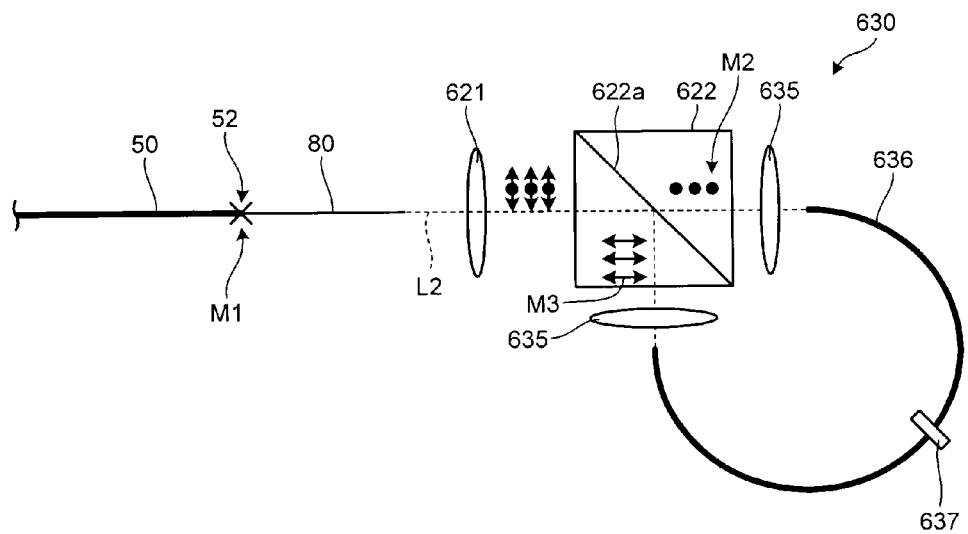
FIG. 14 is a schematic diagram that illustrates a configuration in which a mode field conversion optical fiber is interposed between the polarization axes exchanger of FIG. 13 and a polarization maintaining optical fiber.

FIG. 14 is a schematic diagram that illustrates a configuration in which a mode field conversion optical fiber 80 is interposed between the polarization axes exchanger 630 and the polarization maintaining optical fiber 50. With the configuration of FIG. 14, the same effects as the configuration of FIG. 11 can be achieved.

Figure 15:
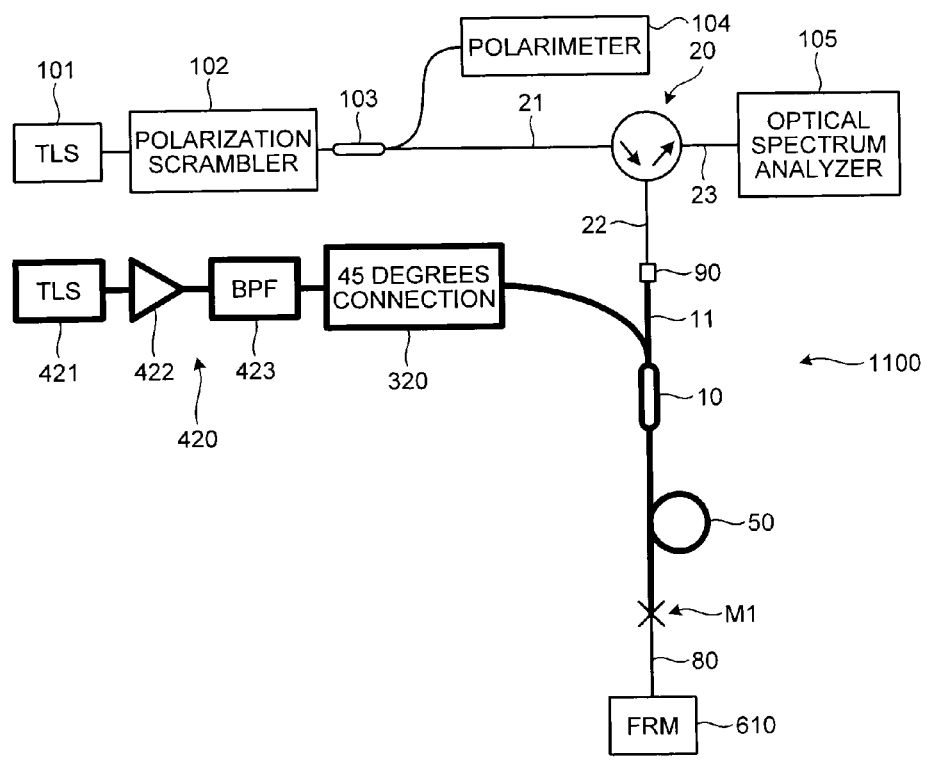
FIG. 15 is a configuration diagram of a measuring system for measuring polarization state dependence of wavelength conversion efficiency of a polarization independent wavelength converter according to Example 1.

The polarization state dependence of wavelength conversion efficiency of a polarization independent wavelength converter according to Example 1 of the present invention was measured. FIG. 15 is a configuration diagram of a measuring system for measuring polarization state dependence of wavelength conversion efficiency of the polarization independent wavelength converter according to Example 1.

As a polarization independent wavelength converter 1100 according to Example 1, use was made of a one including the optical splitter/combiner 10, the optical circulator 20, the two-axis optical power divider 320 as illustrated in FIG. 4, the pump light source 420, the polarization maintaining optical fiber 50, and the polarization axes exchanger 610 to which the mode field conversion optical fiber 80 is connected as illustrated in FIG. 11.

As the pump light source 420, use was made of a one including a tunable light source (TLS) 421, a polarization maintaining optical amplifier 422, and a polarization maintaining optical band pass filter 423. The tunable light source 421 was set so as to output a pump light having a wavelength of 1545 nm. The polarization maintaining optical band pass filter 423 was set so as to transmit the pump light having a wavelength of 1545 nm.

As the optical splitter/combiner 10, use was made of a polarization maintaining 3 dB coupler. The polarization maintaining 3 dB coupler has a return loss is −40 dB or less, is a type which divides light by spatially separating a collimated light, and is a two-port plus one-port type which uses a half mirror.

A tunable light source 101 to output a signal light was connected to the input optical fiber 21 of the optical circulator 20 via a polarization controller 102 and a 20 dB coupler 103. A polarimeter 104 was connected to the 20 dB coupler 103. The input/output optical fiber 22 of the optical circulator 20 and the polarization maintaining optical fiber 50 were connected via a connector 90. An optical spectrum analyzer 105 was connected to the output optical fiber 23 of the optical circulator 20.

Figure 16:
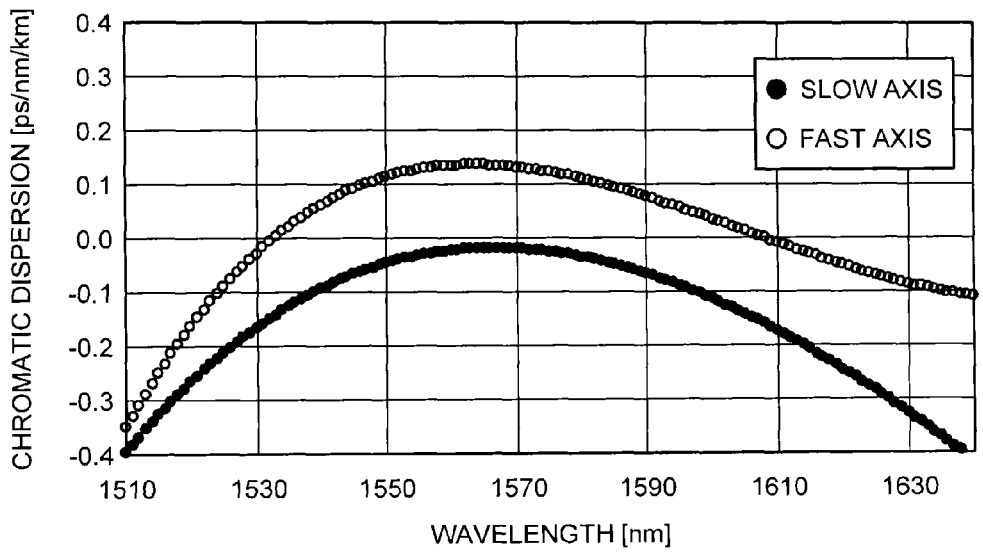
FIG. 16 is a graph that illustrates chromatic dispersion of a polarization maintaining optical fiber which is used in the polarization independent wavelength converter according to Example 1 as a function of wavelength.

A polarization maintaining HNLF was used as the polarization maintaining optical fiber 50. The length of the polarization maintaining optical fiber 50 was 50 m and the nonlinear coefficient γ was about 23. The chromatic dispersion of the polarization maintaining optical fiber 50 is as illustrated in FIG. 16.

As the mode field conversion optical fiber 80, use was made of a dispersion shifted fiber (DSF) according to International Telecommunication Union Telecommunication Standardization Sector (ITU-T) G.653. The fused connection was made in the connecting point M1 between the mode field conversion optical fiber 80 and the polarization maintaining optical fiber 50. The mode field conversion optical fiber 80 and the polarization axes exchanger 610 were connected to each other via a connector.

A signal light was input to the polarization independent wavelength converter 1100, and the power of a wavelength-converted light generated by the polarization independent wavelength converter 1100 was measured by using the optical spectrum analyzer 105. Here, the power of the pump light input to the polarization maintaining optical fiber 50 was set to 10.2 dBm, and the power of the signal light was set to −5 dBm. Moreover, the polarization state of the signal light was confirmed by measuring a portion of the signal light separated by the 20 dB coupler 103 with the polarimeter 104. Moreover, the angle between polarization axes in the two-axis optical power divider 320 was adjusted to be within a range of 45 degrees±5 degrees to minimize a different in power which depends on the polarization state of the signal light of the wavelength-converted light. The adjustment of the angle was performed under the condition of the signal light having a wavelength of 1530 nm and power of −13.8 dBm. In the following experiments, when the wavelength of the pump light was changed, this adjustment was performed whenever the change was made.

Figure 17:
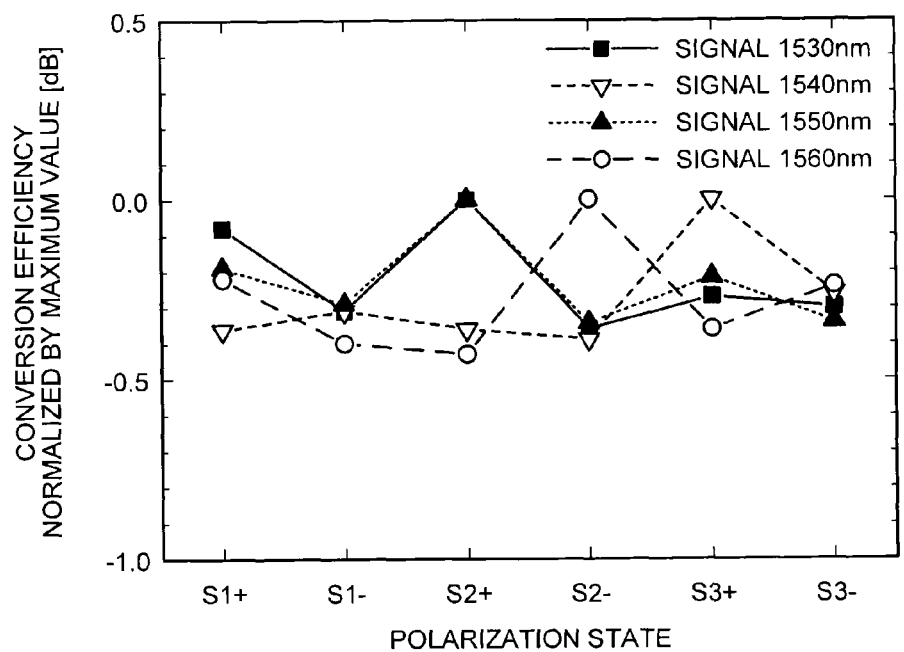
FIG. 17 is a graph that illustrates polarization state dependence of wavelength conversion efficiency of the polarization independent wavelength converter according to Example 1.

FIG. 17 is a graph that illustrates the polarization state dependence of wavelength conversion efficiency of the polarization independent wavelength converter 1100 according to Example 1. Here, the wavelength conversion efficiency is the measured power of the converted light normalized by the power of the signal light input to the polarization maintaining optical fiber 50. In FIG. 17, the power of the wavelength-converted light was measured after the polarization controller 102 had been adjusted so that the polarization state measured with the polarimeter 104 might agree with the orthogonal axis on a Poincare sphere. Moreover, the wavelength of the signal light was set to 1530 nm, 1540 nm, 1550 nm, and 1560 nm. Moreover, in FIG. 17, the horizontal axis indicates polarization states according to Stokes parameters. The wavelength conversion efficiency of the vertical axis indicates values when a reference is the wavelength conversion efficiency in the polarization state with the maximum conversion optical power among conversion optical powers measured on six orthogonal polarization axes for the wavelength of each signal light. As illustrated in FIG. 17, the difference in the wavelength conversion efficiency depending on the polarization state of the signal light was 0.5 dB or less for all the signal light wavelengths.

In Example 1, the polarization maintaining 3 dB coupler which was used as the optical splitter/combiner 10 is a optical fiber device which has a return loss of −40 dB or less, is a type which divides light by spatially separating a collimated light, and uses a half mirror. In this case, the fluctuation of the optical power of the output converted light was 0.5 dB or less. On the other hand, when a polarization maintaining 3 dB coupler of a fused-type was used as the optical splitter/combiner 10, the measurement of the optical power of the output converted light confirmed the fluctuation of about 1 dB.

In Example 1, for the reason that the difference in the polarization dependent optical power of the converted light is small, a polarization maintaining 3 dB optical coupler of the two-port plus one-port type using a half mirror was used as the optical splitter/combiner 10. However, the fused-type polarization maintaining optical coupler may be used as the optical splitter/combiner 10. As for one port side of the fusion type polarization maintaining coupler, another one port is subjected to termination processing and embedded in the coupler. That is, actually, there are two ports plus two ports. In the optical coupler that should be used in Example 1 as the optical splitter/combiner 10, when the reflection from the port which was subjected to the termination processing and is not substantially used is the cause of the fluctuation of the optical power of the converted light, the fluctuation of the optical power of the converted light can be suppressed by reducing an return loss on the port to a −40 dB or less. That is, if an internal return loss is −40 dB or less, a polarization maintaining optical coupler of any type, for example, the fused-type or a type using a multi-layered film filter, can be adopted as the optical splitter/combiner 10 of Example 1 regardless of the type.

Next, the wavelength conversion bandwidth of the polarization independent wavelength converter 1100 was measured. In the measurement, the wavelength of the pump light was initially set to 1530, 1540, 1550, 1560 or 1570 nm, and the power of the wavelength-converted light was measured with use of the optical spectrum analyzer while changing the wavelength of the input signal light.

Figure 18:
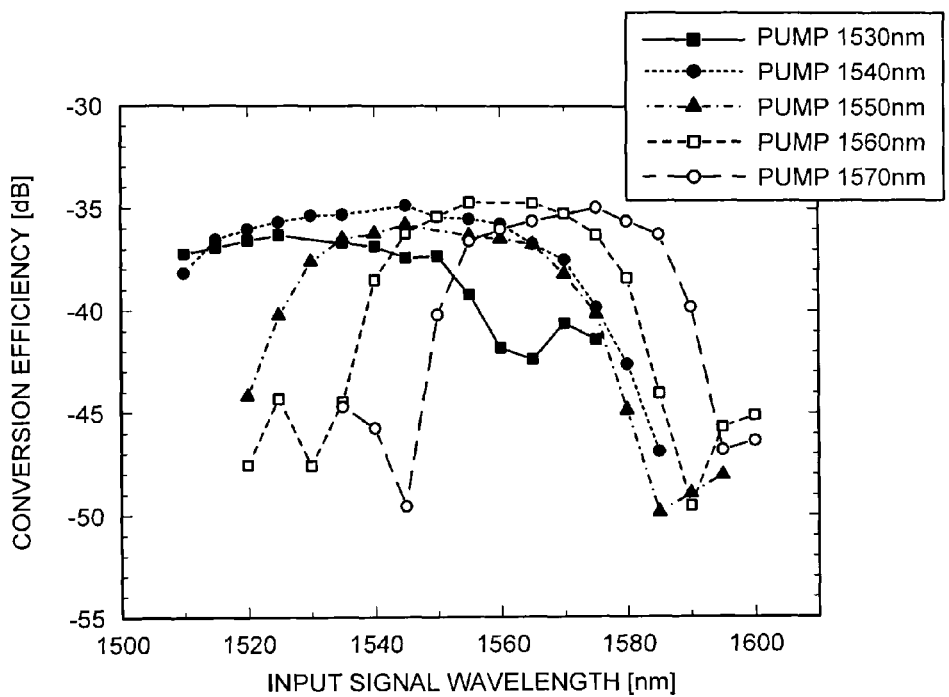
FIG. 18 is a graph that illustrates input signal light wavelength dependence, in each pump light wavelength, of wavelength conversion efficiency of the polarization independent wavelength converter according to Example 1.

FIG. 18 is a graph that illustrates input signal wavelength dependence of wavelength conversion efficiency of the polarization independent wavelength converter 1100 in each pump light wavelength. As illustrated in FIG. 18, it is understood that the difference in the maximum conversion efficiency for each pump wavelength falls within 1.6 dB though the wavelength of the pump light was greatly changed in a range of 40 nm from 1530 nm to 1570 nm.

Figure 19:
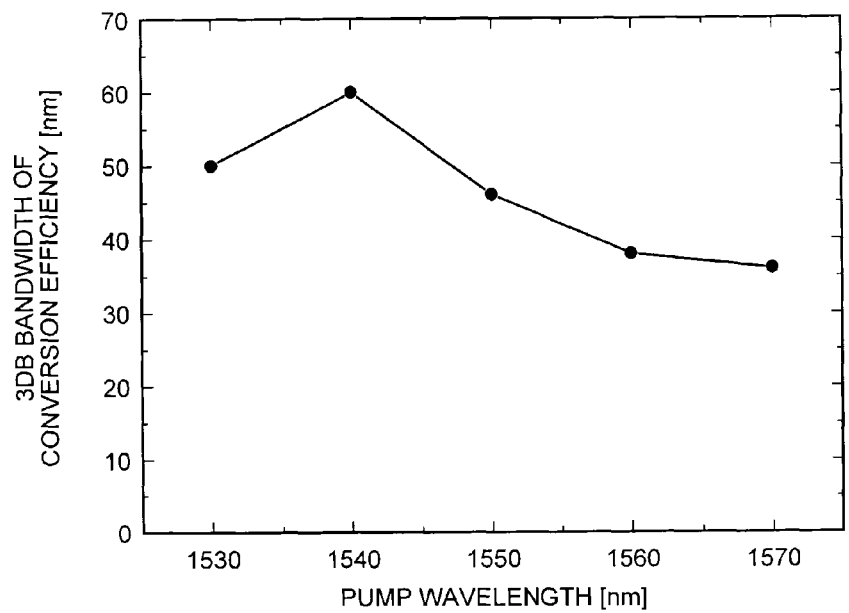
FIG. 19 is a graph that illustrates pump light wavelength dependence of a 3 dB wavelength conversion bandwidth of the polarization independent wavelength converter according to Example 1.

Next, 3 dB wavelength conversion bandwidths in each pump wavelength were obtained from the graph of FIG. 18. FIG. 19 is a graph that illustrates pump wavelength dependence of 3 dB wavelength conversion bandwidth of the polarization independent wavelength converter 1100. As illustrated in FIG. 19, the 3 dB wavelength conversion bandwidth of 35 nm or more is obtained for all pump wavelengths. This implies that the wavelength conversion from an arbitrary wavelength to another arbitrary wavelength is possible, for example, within a C band of from 1530 nm to 1565 nm by the polarization independent wavelength converter 1100 of Example 1.

It is also understood that the difference in the chromatic dispersion between the slow axis and the fast axis is only 0.1 to 0.2 [ps/nm/km] from the chromatic dispersion characteristic of the polarization maintaining optical fiber 50 illustrated in FIG. 16. In addition, the fast axis has the zero dispersion values in 1530 nm and 1610 nm. On the other hand, in the slow axis, the chromatic dispersion mostly approximates zero in about 1570 nm.

Here, when the chromatic dispersion value is zero or as it becomes nearer zero in the wavelength of the pump light, the wavelength conversion bandwidth is increased. Therefore, when the signal light and the pump light propagate along the fast axis of the polarization maintaining optical fiber 50, the wavelength conversion bandwidth is broad when the wavelength of the pump light is around 1530 nm or 1610 nm, and the wavelength conversion bandwidth is narrow when the wavelength of the pump light is around an intermediate wavelength thereof, for example, 1570 nm. On the other hand, when the signal light and the pump light propagate along the slow axis of the polarization maintaining optical fiber 50, the wavelength conversion bandwidth is broadest when the wavelength of the pump light is around 1570 nm.

In the case of FIG. 19, it is considered that the 3 dB wavelength conversion bandwidth is maximum when the wavelength of the pump light is 1540 nm because the effect of increasing the wavelength conversion bandwidth based on the zero dispersion value of 1530 nm in the fast axis is strongly exhibited and the effect of increasing the wavelength conversion bandwidth based on the near zero dispersion value of 1570 nm in the slow axis is exhibited.

In order to broaden the bandwidth of the wavelength conversion bandwidth, it is desirable that the chromatic dispersion value of the slow axis and the fast axis of the polarization maintaining optical fiber 50 is in the range of −0.2 to 0.2 [ps/nm/km] for the entire bandwidth to be subjected to wavelength conversion. As for the chromatic dispersion value of the slow axis or the fast axis, or the chromatic dispersion values of both of the axes, it is also desirable that the difference between the maximum value and the minimum value of the chromatic dispersion value is 0.2 [ps/nm/km] or less and is uniform for the entire bandwidth to be subjected to wavelength conversion. In addition, the difference in the chromatic dispersion value between the slow axis and the fast axis is almost equal for the entire bandwidth to be subjected to the wavelength conversion, for example, it is desirably 0.2 [ps/nm/km] or less.

Figure 20:
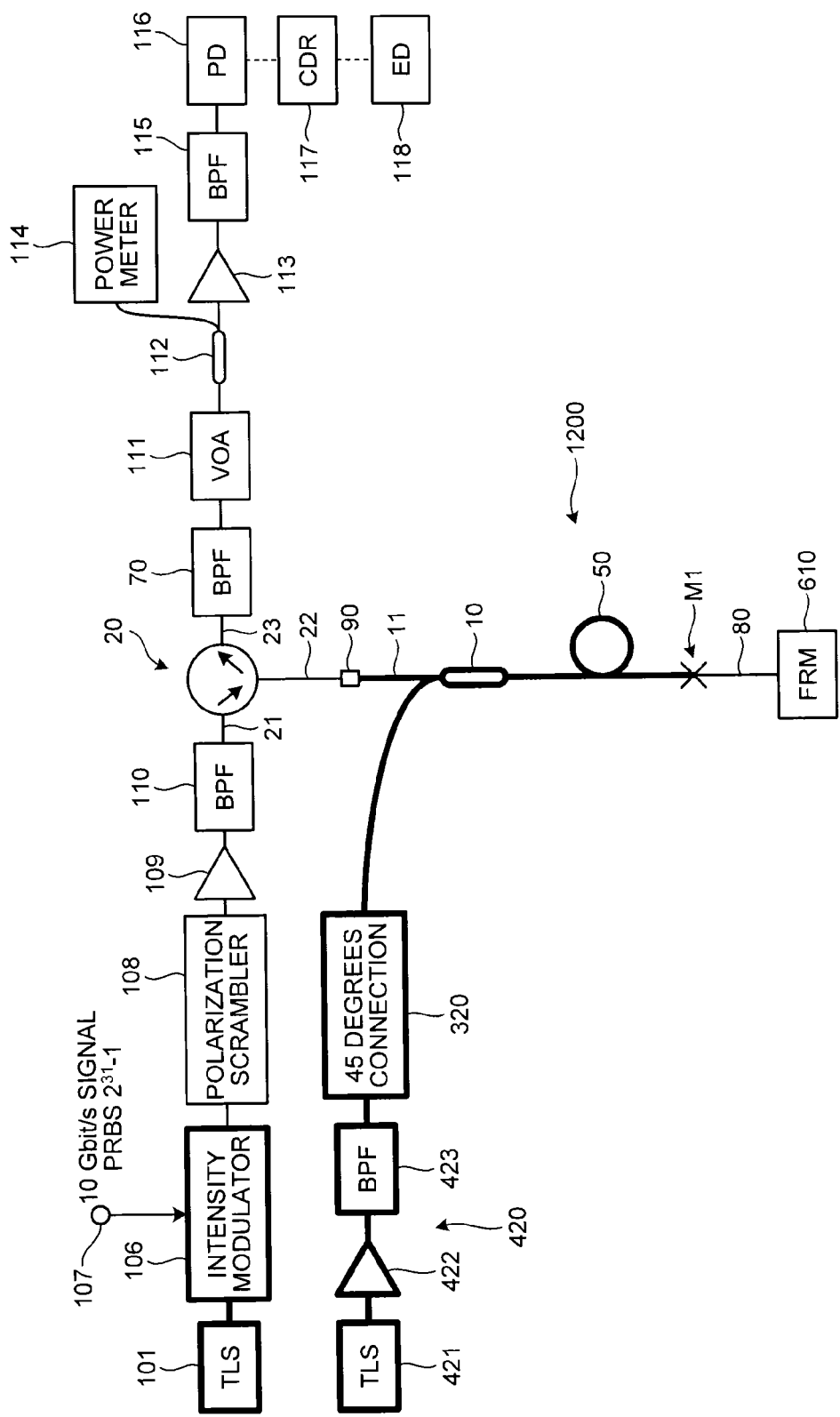
FIG. 20 is a configuration diagram of a measuring system for measuring an optical transmission characteristic of wavelength conversion efficiency of a polarization independent wavelength converter according to Example 2.

An optical transmission characteristic of a polarization independent wavelength converter according to Example 2 of the present invention is measured using an intensity-modulated signal light. FIG. 20 is a configuration diagram of a measuring system for measuring an optical transmission characteristic of wavelength conversion efficiency of the polarization independent wavelength converter according to Example 2. As a polarization independent wavelength converter 1200 according to Example 2, use was made of a one obtained by adding the optical band pass filter 70 to the polarization independent wavelength converter 1100 according to Example 1 such that the optical band pass filter 70 is provided in the output optical fiber 23 of the optical circulator 20.

The tunable light source 421 of the pump light source 420 was set so as to output a pump light having a wavelength of 1545 nm. The polarization maintaining optical band pass filter 423 was set so as to transmit the pump light having a wavelength of 1545 nm.

On the other hand, the signal light having a wavelength 1530 nm output from the tunable light source 101 is intensity-modulated with an intensity modulator 106 driven by an electrical signal having a Pseudo-Random Binary Sequence (PRBS) length of $2^{31}-1$ output from a signal source 107 so as to produce a 10 Gbit/s-NRZ (non-return to zero) signal light. In addition, the 10G bit/s-NRZ signal light was input to a polarization scrambler 108 so that a 10 Gbit/s-NRZ signal light of a random polarization state (hereafter, referred to as intensity-modulated signal light) was produced. Next, the intensity-modulated signal light was optically amplified by an optical amplifier 109, the amplified signal light is made to pass through an optical band pass filter 110 so that amplified spontaneous emission (ASE) light generated in the optical amplifier 109 may be removed, and then the resultant signal light is input to the input optical fiber 21 of the optical circulator 20. Here, the power of the pump light input to the polarization maintaining optical fiber 50 was set to 18.3 dBm, and the power of the intensity-modulated signal light was set to 11.6 dBm. Next, the polarization independent wavelength converter 1200 generates a wavelength-converted light.

Figure 21:
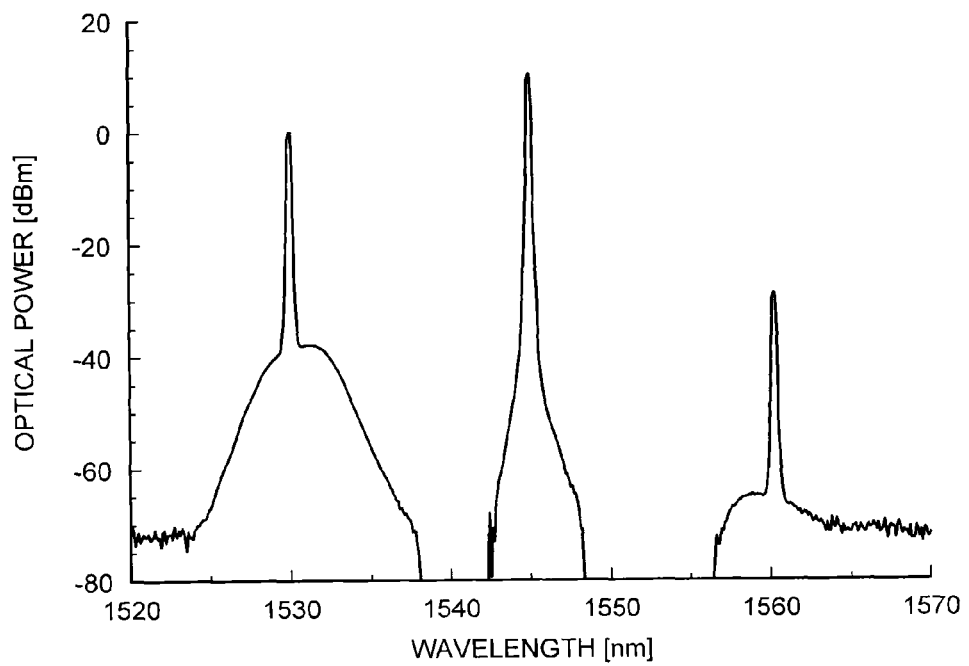
FIG. 21 is an optical spectrum of output light from an output optical fiber of an optical circulator of the polarization independent wavelength converter according to Example 2.

FIG. 21 is an optical power spectrum of light which is output from an output optical fiber 23 of the optical circulator 20 of the polarization independent wavelength converter 1200. In FIG. 21, lights having a peak at 1530 nm, 1545 nm, and 1560 nm, respectively are an intensity-modulated signal light, a pump light, and a wavelength-converted light, respectively.

Next, the light output from the output optical fiber 23 was input to the optical band pass filter 70, and only the wavelength-converted light passed. Next, after the power of the wavelength-converted light was adjusted by a variable optical attenuator (VOA) 111, the wavelength-converted light was made to pass through a 17 dB coupler 112, and the wavelength-converted light was then optically amplified by an optical amplifier 113. Next, the amplified light was made to pass through an optical band pass filter 115 to remove the ASE light which had generated in the optical amplifier 113, and the wavelength-converted light was input to a photodiode (PD) 116. The wavelength-converted light is converted into an electrical signal by the photodiode 116. The converted electrical signal was made to pass through a clock data recovery (CDR) 117, and then input to an error detector (ED) 118, so that bit error rate (BER) of the converted light was measured. Received power was obtained as follows: optical power input to the optical amplifier 113 provided in a subsequent stage of the variable optical attenuator 111 was calculated from the value, which was obtained by measuring a portion of the wavelength-converted light which was divided by the 17 dB coupler 112 with a power meter 114, and the calculated value was used as the received power.

Figure 22:
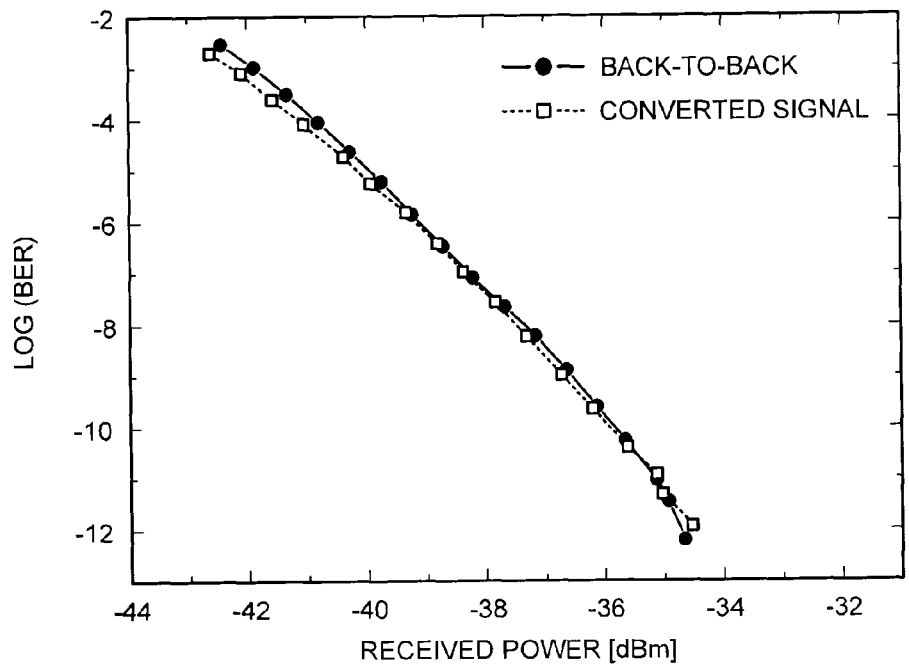
FIG. 22 is a graph that illustrates a BER measured with the measuring system illustrated in FIG. 20.

FIG. 22 is a graph that illustrates a BER measured with the measuring system illustrated in FIG. 20. The back-to-back measurement was performed by inputting a 10 Gbit/s-NRZ signal light of a random polarization state which has a wavelength of 1560 nm to the variable optical attenuator 111. As illustrated in FIG. 22, it was understood that the BER of the wavelength-converted light exhibits error free and the $10^{-9}$ BER exhibits penalty free, from the measurement. This result shows that the polarization independent wavelength converter 1200 according to Example 2 can convert the wavelength of the intensity-modulated signal light without depending on the polarization state and the wavelength-converted light maintains the information included in the input signal light.

Figure 23:
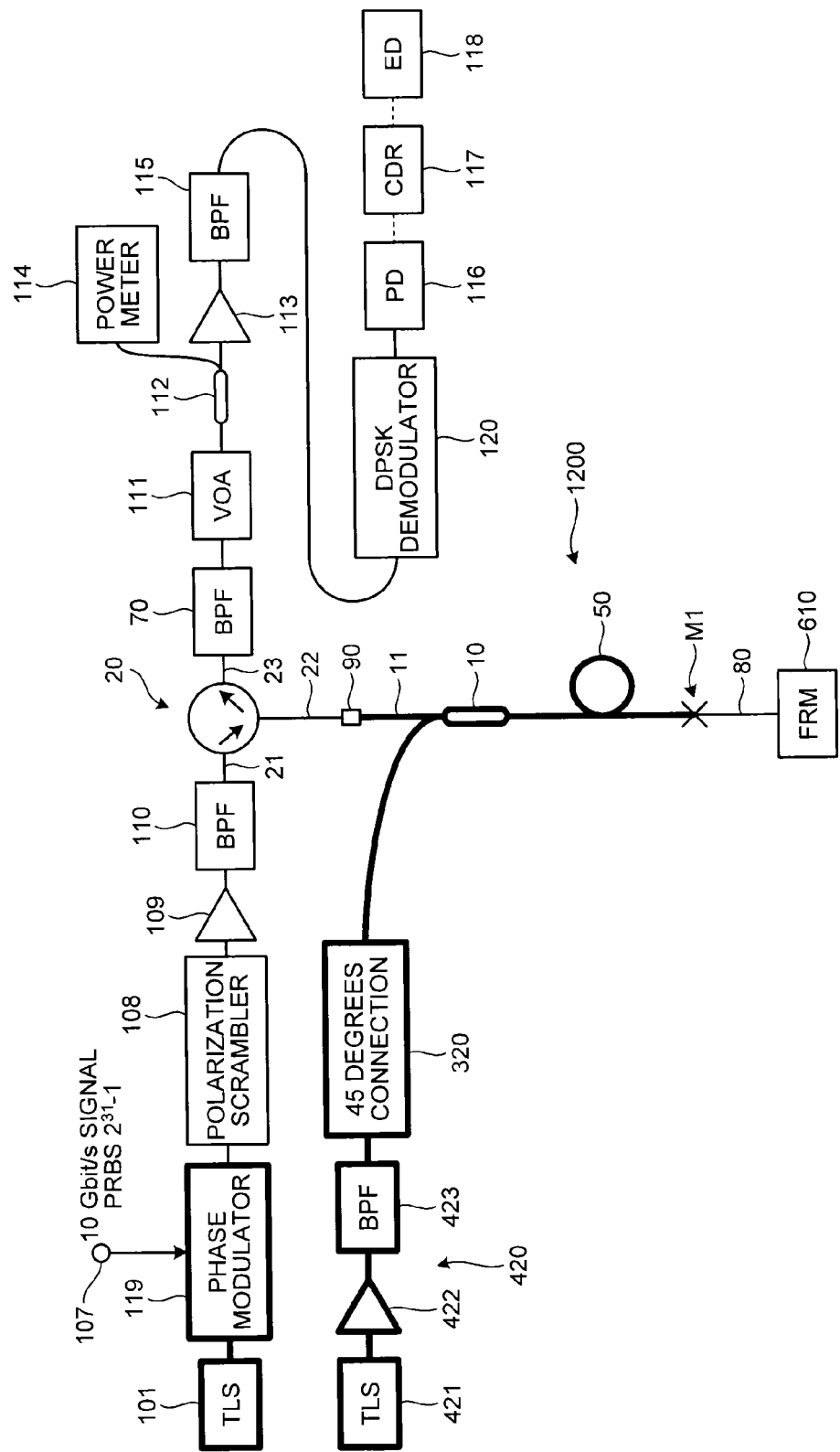
FIG. 23 is a configuration diagram of a measuring system for measuring a optical transmission characteristic of wavelength conversion efficiency of the polarization independent wavelength converter according to Example 2.

An optical transmission characteristic of a polarization independent wavelength converter according to Example 2 of the present invention was measured using a phase-modulated signal light. FIG. 23 is a configuration diagram of a measuring system for measuring an optical transmission characteristic of wavelength conversion efficiency of the polarization independent wavelength converter according to Example 2.

The measuring system in FIG. 23 is obtained by changing the configuration of the measuring system of FIG. 20 such that that the intensity modulator 106 is replaced with a phase modulator 119 and a DPSK demodulator 120 is provided between the optical band pass filter 115 and the photodiode 116.

In this measuring system, a signal light having a wavelength 1530 nm output from the tunable light source 101 is phase-modulated with the phase modulator 119 driven by an electrical signal having a PRBS length of $2^{31}-1$ output from the signal source 107 so as to produce a 10 Gbit/s-differential phase shift keying (DPSK) signal light, and the 10 Gbit/s-DPSK signal light is input to the polarization scrambler 108 to produce a 10 Gbit/s-DPSK signal light of a random polarization state (hereinafter, referred to as phase-modulated signal light). Next, the phase-modulated signal light was optically amplified by the optical amplifier 109, was made to pass through the optical band pass filter 110, and was input to the input optical fiber 21 of the optical circulator 20. As a result, a wavelength-converted light was generated by the polarization independent wavelength converter 1200.

Next, the light output from the output optical fiber 23 was input to the optical band pass filter 70 so that only the wavelength-converted light was transmitted, and the transmitted light was made to pass sequentially through the variable optical attenuator 111, the 17 dB coupler 112, the optical amplifier 113, and the optical band pass filter 115. After that, the wavelength-converted light was demodulated by the DPSK demodulator 120. Next, the demodulated wavelength-converted light was input to the photodiode 116 so that the wavelength-converted light was converted into an electrical signal, the electrical signal is made to pass through the CDR 117, and the passed signal is input to the error detector 118 so that BER of the wavelength-converted light was measured. Received power was obtained as follows: optical power input to the optical amplifier 113 provided in a subsequent stage of the variable optical attenuator 111 was calculated from the value, which was obtained by measuring a portion of the wavelength-converted light which was divided by the 17 dB coupler 112 with the power meter 114, and the calculated value was used as the received power.

Figure 24:
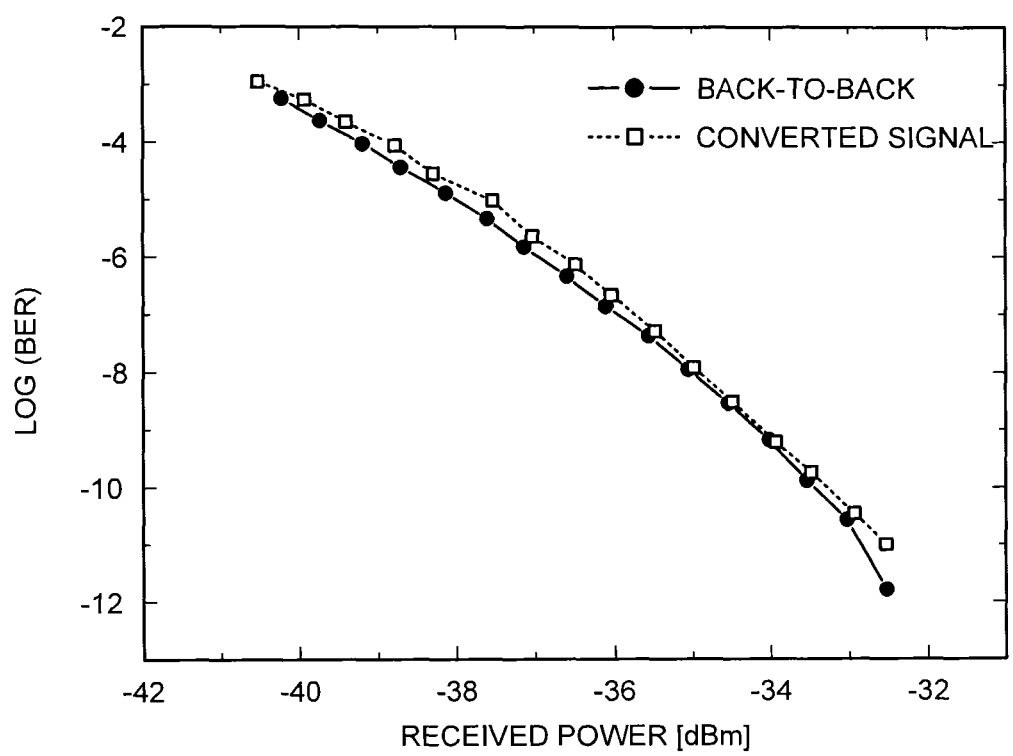
FIG. 24 is a graph that illustrates a BER measured by the measuring system illustrated in FIG. 23.

FIG. 24 is a graph that illustrates a BER measured with the measuring system illustrated in FIG. 23. The back-to-back measurement was performed by inputting a 10 Gbit/s-DPSK signal light of a random polarization state which has a wavelength of 1560 nm to the variable optical attenuator 111. As illustrated in FIG. 24, it was understood that the BER of the wavelength-converted light exhibits error free and the $10^{-9}$ BER exhibits penalty free, from the measurement. This result shows that the polarization independent wavelength converter 1200 according to Example 2 can convert the wavelength of the phase-modulated signal light without depending on the polarization state and the wavelength-converted light maintains the information included in the input signal light.

Figure 25:
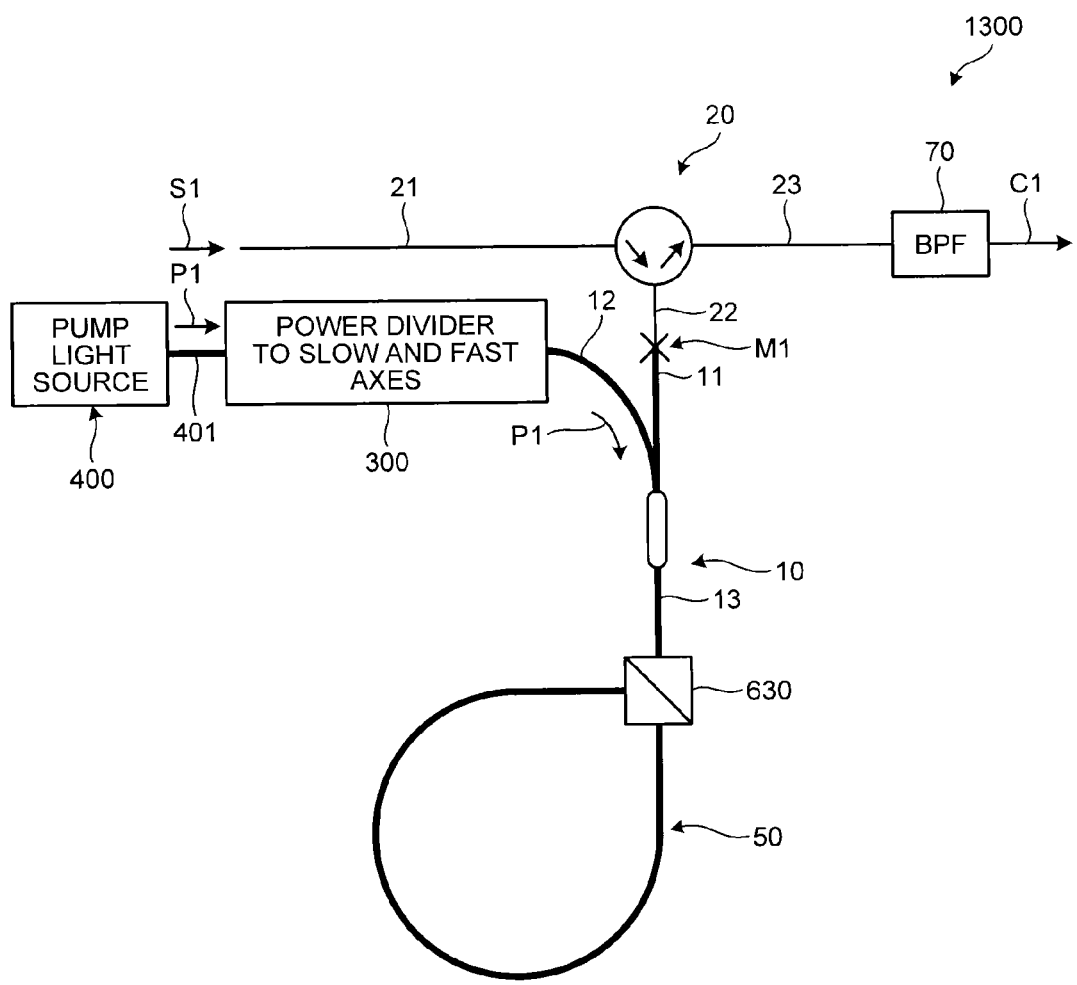
FIG. 25 is a schematic diagram that illustrates a basic configuration of the polarization independent wavelength converter according to a second embodiment of the present invention.

FIG. 25 is a schematic diagram that illustrates a basic configuration of a polarization independent wavelength converter according to a second embodiment of the present invention. As illustrated in FIG. 25, a polarization independent wavelength converter 1300 is configured by replacing the configuration of the output side of the input/output optical fiber 13 of the optical splitter/combiner 10 of the polarization independent wavelength converter 1000 illustrated in FIG. 1 with a configuration in which the polarization axes exchanger 630 and the polarization maintaining optical fiber 50, which is connected to the polarization axes exchanger 630 in a loop shape, are included.

Figure 26:
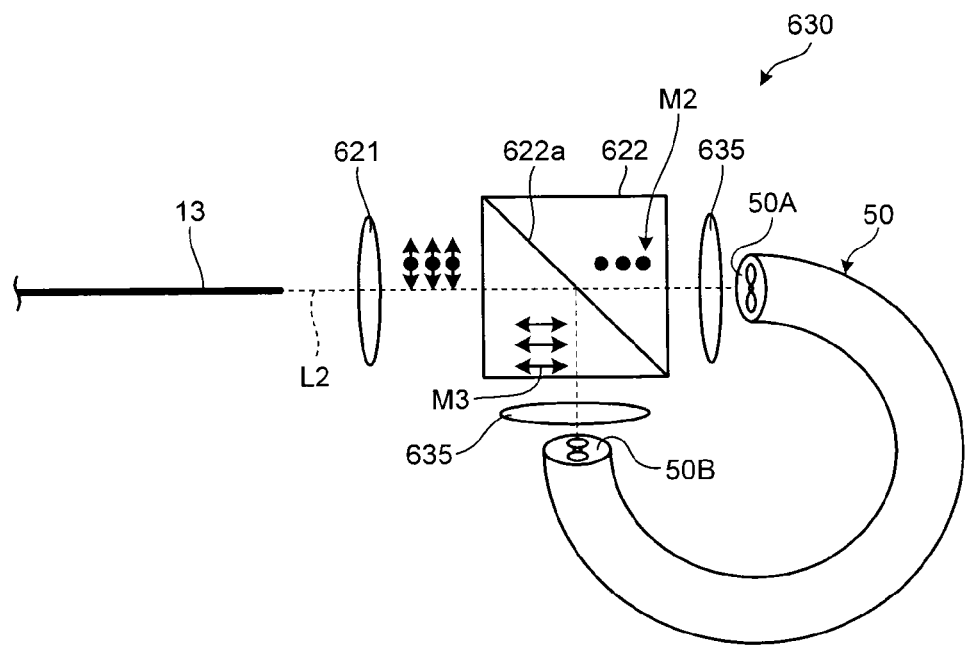
FIG. 26 is a schematic diagram that illustrates a configuration of a main portion of the polarization independent wavelength converter according to the second embodiment.

FIG. 26 is a schematic diagram that illustrates a configuration of a main portion of the polarization independent wavelength converter 1300 according to the second embodiment. In the polarization axes exchanger 630, the collimator lens 621 makes the light L2 output from the input/output optical fiber 13 a parallel light. The light L2 includes a signal light and a pump light. A polarization beam splitter 622 splits the light L2 into two lights having polarization components orthogonal to each other with the separation surface 622a. The lights of two polarization components split by the polarization splitter 622 are output from the polarization splitter 622, and then input to the polarization maintaining optical fiber 50 which forms a loop-shaped path by the condenser lenses 635.

Here, an end surface 50A of the polarization maintaining optical fiber 50 is disposed such that light of a polarization component, of which the polarization direction is denoted by the sign M2 and which is output to the left side of the sheet of the separation surface 622a is input along the fast axis of the polarization maintaining optical fiber 50. Similarly, an end surface 50B of the polarization maintaining optical fiber 50 is disposed such that light of a polarization component, of which the polarization direction is denoted by the sign M3 and which is output to the lower side of the sheet is input along the fast axis of the polarization maintaining optical fiber 50. As a result, each of the lights of the two polarization components, input to the respective end surfaces 50A and 50B of the polarization maintaining optical fiber 50 propagates in the direction of clockwise or counterclockwise along the fast axis of the polarization maintaining optical fiber 50 while generating the wavelength-converted light, and then is output from the end surface 50B or 50A which is opposite to the input-side end surface thereof. The light (including signal light, pump light, and wavelength-converted light) output from each end surface 50A or 50B is combined by the polarization beam splitter 622, and is then input to the input/output optical fiber 13.

According to the above-described configuration, all the lights including the wavelength-converted light, which propagate in the direction of clockwise or counterclockwise in the polarization maintaining optical fiber 50, propagate along the fast axis. Accordingly, the lights are not influenced by the difference in group velocity.

Figure 27:
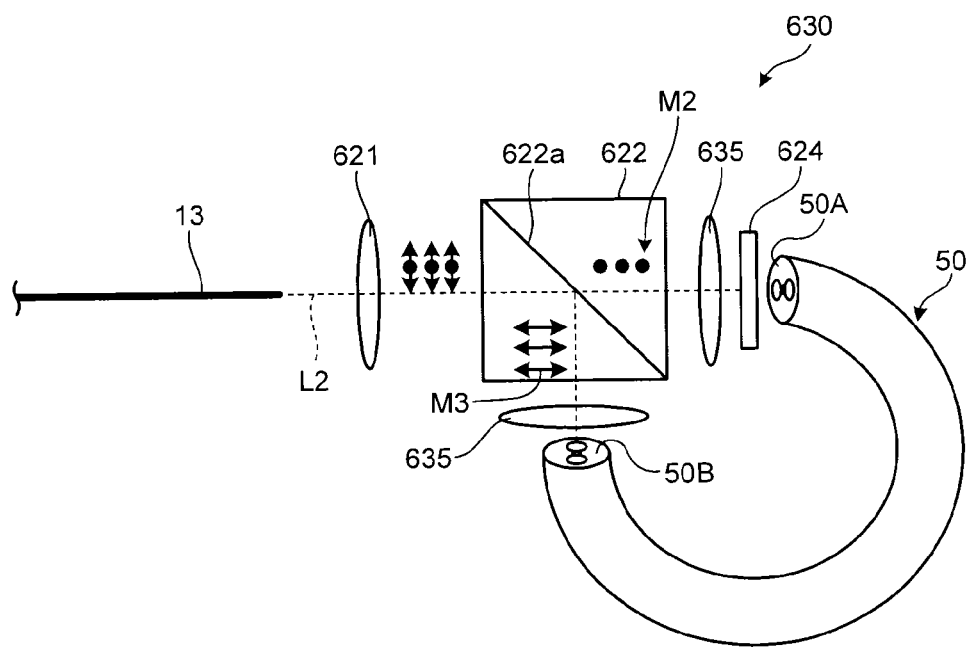
FIG. 27 is a schematic diagram that illustrates a modification of the polarization axes exchanger according to the second embodiment.

FIG. 27 is a schematic diagram that illustrates a specific configuration of a modification of the polarization independent wavelength converter according to the second embodiment. In the modification of FIG. 27, a direction of the polarization axis of the end surface 50A of the polarization maintaining optical fiber 50 disposed on the left side of the sheet of the polarization beam splitter 622 is rotated with respect to the direction of the case of FIG. 26 by 90 degrees. Moreover, the λ/2 plate 624 is inserted between the end surface 50A and the condenser lens 635. Because of the λ/2 plate 624, the polarization direction of the light of the polarization component, of which the polarization direction is denoted by the sign M2, is rotated by 90 degrees so that the polarization is changed to the polarization direction denoted by the sign M3, and then the light is input along the fast axis of the polarization maintaining optical fiber 50 from the end surface 50A. According to the above-described configuration, all the lights including the wavelength-converted light, which are input from the respective end surfaces 50A and 50B and propagate in the direction of clockwise or counterclockwise in the polarization maintaining optical fiber 50, propagate along the fast axis. Accordingly, the lights are not influenced by the difference in group velocity.

In the second embodiment, the lights of the respective polarization components input from the respective end surfaces 50A and 50B of the polarization maintaining optical fiber 50 are configured to propagate along the fast axis, but the lights of the respective polarization components may be configured to propagate along the slow axis. As the polarization axis to propagate the light, a polarization axis in which the wavelength conversion bandwidth can be made broader is preferably selected. In the case of the chromatic dispersion characteristic of each polarization axis of the polarization maintaining optical fiber 50 illustrated in FIG. 16, a wavelength bandwidth where the absolute value of the chromatic dispersion is small (for example, a range of −0.2 to 0.2 [ps/nm/km]) is broader in the fast axis than in the slow axis. Accordingly, the fast axis is preferably selected as the polarization axis to propagate light because the wavelength conversion bandwidth can be made broader. In this way, only the polarization axis which has a relatively broad wavelength conversion bandwidth can be selectively used for the wavelength conversion in the second embodiment, far broader bandwidth can be achieved in the wavelength conversion. In addition, when the arrangement of the polarization maintaining optical fiber 50 illustrated FIG. 26 is used, more wideband wavelength conversion can be achieved compared with the case of using the configuration in which a λ/2 plate having a wavelength dependent characteristic is used like FIG. 27.

The present invention has an advantageous effect that a wavelength-converted light which is output can maintain information included in an input signal light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polarization independent wavelength converter comprising:
 a polarization maintaining optical fiber that includes a first end and a second end, and has a first polarization axis and a second polarization axis, the first polarization axis and the second polarization axis being orthogonal to each other and propagating light at different velocities; and
 a group velocity difference cancellation unit that receives a signal light having a certain polarization state and a pump light including a polarization component parallel to the first polarization axis and a polarization component parallel to the second polarization axis and that causes the signal light and a wavelength-converted light to pass through the polarization maintaining optical fiber in a manner not to be influenced by a group velocity difference of each of the signal light and the wavelength-converted light between the first polarization axis and the second polarization axis, the wavelength converted light being light generated in the polarization maintaining optical fiber by propagation of the signal light and the pump light through the polarization maintaining optical fiber.

2. The polarization independent wavelength converter according to claim 1, wherein
the group velocity difference cancellation unit includes:
a light input part that inputs the signal light and the pump light to the first end of the polarization maintaining optical fiber; and
a polarization axes exchanger that inputs the wavelength-converted light, which is output from the second end of the polarization maintaining optical fiber and which includes a first wavelength-converted light having a polarization direction parallel to the first polarization axis and a second wavelength-converted light having a polarization direction parallel to the second polarization axis, to the second end in such a manner that the polarization direction of the first wavelength-converted light becomes parallel to the second polarization axis and the polarization direction of the second wavelength-converted light become parallel to the first polarization axis.

3. The polarization independent wavelength converter according to claim 1, wherein
the group velocity difference cancellation unit includes:
a polarization axes exchanger that separates each of the signal light and the pump light into a first polarization component and a second polarization component orthogonal to each other, inputs the first polarization component from the first end of the polarization maintaining optical fiber so as to propagate along the first polarization axis and the second polarization component from the second end of the polarization maintaining optical fiber so as to propagate along the first polarization axis, combines the polarization component of the wavelength-converted light, having a polarization direction parallel to the first polarization axis and being output from the first end, and the polarization component of the wavelength-converted light, having a polarization direction parallel to the first polarization axis and being output from the second end, and outputs the combined light; and
a light inputting part that inputs the signal light and the pump light to the polarization axes exchanger.

4. The polarization independent wavelength converter according to claim 1, further comprising:
an optical power divider that adjusts an optical power of the pump light by dividing power of the pump light so as to be distributed to the first polarization axis and the second polarization axis in a manner that a polarization state dependence of the signal light in a wavelength conversion efficiency of the wavelength-converted light generated in the polarization maintaining optical fiber is reduced.

5. The polarization independent wavelength converter according to claim 1, further comprising:
an optical power divider that is able to adjust an optical power of the pump light such that an optical power distributed to the first polarization axis and an optical power distributed to the second polarization axis are equal.

6. The polarization independent wavelength converter according to claim 1, further comprising:
an optical power divider that inputs the pump light to the polarization maintaining optical fiber in a linearly polarized state which is slant at an angle of 45 degrees ±5 degrees with respect to the first polarization axis and the second polarization axis.

7. The polarization independent wavelength converter according to claim 6, wherein
the optical power divider causes the pump light to enter the linearly polarized state by using two polarization maintaining-type optical fibers that are connected to each other such that first polarization axes thereof have an angle of 45 degrees ±5 degrees therebetween.

8. The polarization independent wavelength converter according to claim 6, wherein
the optical power divider causes the pump light to enter the linearly polarized state by using a polarizer, and a $\lambda/2$ plate or a $\lambda/4$ plate, which are connected in series to each other.

9. The polarization independent wavelength converter according to claim 2, wherein
the polarization axes exchanger includes a Faraday rotator mirror.

10. The polarization independent wavelength converter according to claim 2, wherein
the polarization axes exchanger includes:
a polarization beam splitter that outputs the first wavelength-converted light from a first output part and the second wavelength-converted light from a second output part; and
a loop-shaped optical system that connects the first output part and the second output part of the polarization beam splitter to each other and rotates the polarization state of each of the first wavelength-converted light and the second the wavelength-converted light by 90 degrees.

11. The polarization independent wavelength converter according to claim 2, further comprising:
a mode field conversion optical fiber interposed between the polarization maintaining optical fiber and the polarization axes exchanger.

12. The polarization independent wavelength converter according to claim 1, wherein
the polarization maintaining optical fiber is a high nonlinear fiber having a nonlinear coefficient of 5 [1/W/km] or more.

13. The polarization independent wavelength converter according to claim 1, wherein
a chromatic dispersion value of the polarization maintaining optical fiber is in a range of −0.2 to 0.2 [ps/nm/km] for an entire bandwidth to be subjected to wavelength conversion.

14. The polarization independent wavelength converter according to claim 1, wherein,
in the polarization maintaining optical fiber, a difference in a chromatic dispersion value between the first the polarization axis and the second polarization axis is 0.2 [ps/nm/km] or less for an entire bandwidth to be subjected to wavelength conversion.

15. The polarization independent wavelength converter according to claim 1, wherein
the light input part has a return-loss of −40 dB or less.

16. The polarization independent wavelength converter according to claim 2, wherein
the light input part includes an optical splitter/combiner that splits a light by spatially dividing a collimated light into two polarization components.

17. The polarization independent wavelength converter according to claim 2, wherein the light input part is a fused-type optical splitter/combiner having an unused port, the unused port being subjected to termination processing and having a return-loss of −40 dB or less.

18. The polarization independent wavelength converter according to claim 1, wherein
the pump light includes a first pump light polarized in parallel to the first polarization axis and a second pump light polarized in parallel to the second polarization axis, the first pump light and the second pump light being equal in wavelength and being independently adjusted in optical power so as to be input.

19. A polarization independent wavelength conversion method comprising:
receiving a signal light and a pump light, the signal light and the pump light being lights to be input to a polarization maintaining optical fiber including a first end and a second end and having a first polarization axis and a second polarization axis, the first polarization axis and the second polarization axis being orthogonal to each other and propagating light at different velocities, the signal light having a certain polarization state, the pump light including a polarization component parallel to the first polarization axis and a polarization component parallel to the second polarization axis; and causing the signal light and a wavelength-converted light to pass through the polarization maintaining optical fiber in a manner not to be influenced by a group velocity difference of each of the signal light and the wavelength-converted light between the first polarization axis and the second polarization axis, the wavelength-converted light being light generated in the polarization maintaining optical fiber by propagation of the signal light and the pump light through the polarization maintaining optical fiber.

* * * * *